(12) United States Patent
Robinson

(10) Patent No.: US 12,552,217 B2
(45) Date of Patent: Feb. 17, 2026

(54) NOISE IMPROVEMENT FOR FAST HIGH LIFT GAS SPRINGS

(71) Applicant: JAGUAR LAND ROVER LIMITED, Coventry (GB)

(72) Inventor: Christopher Robinson, Coventry (GB)

(73) Assignee: Jaguar Land Rover Limited, Warwickshire (GB)

( * ) Notice: Subject to any disclaimer, the term of this patent is extended or adjusted under 35 U.S.C. 154(b) by 153 days.

(21) Appl. No.: 17/971,510

(22) Filed: Oct. 21, 2022

(65) Prior Publication Data

US 2023/0131585 A1    Apr. 27, 2023

(30) Foreign Application Priority Data

Oct. 21, 2021   (GB) .................................... 2115074

(51) Int. Cl.
*B60G 17/052* (2006.01)
*B60G 11/27* (2006.01)

(52) U.S. Cl.
CPC .......... *B60G 17/0521* (2013.01); *B60G 11/27* (2013.01); *B60G 2202/152* (2013.01); *B60G 2204/62* (2013.01); *B60G 2206/422* (2013.01); *B60G 2500/201* (2013.01); *B60G 2500/30* (2013.01); *B60G 2800/162* (2013.01); *B60G 2800/914* (2013.01); *B60G 2800/916* (2013.01)

(58) Field of Classification Search
CPC ........ B60G 11/26; B60G 11/27; B60G 13/10; B60G 17/0155; F16F 9/02
See application file for complete search history.

(56) References Cited

U.S. PATENT DOCUMENTS

| | | | |
|---|---|---|---|
| 4,468,050 A * | 8/1984 | Woods ............... | B60G 17/0155 280/DIG. 1 |
| 8,534,687 B2 * | 9/2013 | Coombs .................... | F16F 9/46 188/266.2 |
| 9,707,817 B1 * | 7/2017 | Arnott ....................... | F16F 9/05 |
| 2005/0179177 A1 * | 8/2005 | Thomae ............. | B60G 17/0521 267/64.27 |
| 2007/0052141 A1 * | 3/2007 | Li .......................... | B60G 11/27 267/64.11 |

(Continued)

FOREIGN PATENT DOCUMENTS

| DE | 10121582 A1 | 11/2002 |
|---|---|---|
| KR | 20010048166 A | 6/2001 |

OTHER PUBLICATIONS

Combined Search and Examination Report under Sections 17 and 18(3) corresponding to Great Britain Application No. GB2115074. 3, dated Feb. 11, 2022, 6 pages.

*Primary Examiner* — James A Shriver, II
(74) *Attorney, Agent, or Firm* — Troutman Pepper Locke LLP; Dustin B. Weeks; Nicholas H. Doss

(57) ABSTRACT

A gas spring for use in a gas suspension system. The gas spring includes a gas inlet port configured to receive compressed gas and a gas inlet chamber connected via an inlet conduit to the gas inlet port and via an opening to an internal volume of the gas spring. The inlet conduit is connected to the gas inlet chamber at a position offset from a central axis of the gas inlet chamber such that an angle between a longitudinal axis of the gas inlet port and a surface of an interior wall of the gas inlet chamber opposing the gas inlet port is acute.

18 Claims, 11 Drawing Sheets

(56) References Cited

U.S. PATENT DOCUMENTS

| | | | |
|---|---|---|---|
| 2013/0320645 A1* | 12/2013 | Gall | B60G 17/056 |
| | | | 280/124.16 |
| 2014/0062040 A1* | 3/2014 | Holden | B60G 15/12 |
| | | | 267/64.11 |
| 2014/0252743 A1* | 9/2014 | Pielock | F16F 9/0463 |
| | | | 280/124.157 |
| 2014/0300076 A1* | 10/2014 | Fulton | B60G 11/30 |
| | | | 280/124.161 |
| 2016/0280034 A1* | 9/2016 | Ogino | B60G 17/052 |
| 2019/0039680 A1* | 2/2019 | Angell | B60G 15/12 |
| 2019/0111754 A1* | 4/2019 | Lee | B60G 17/019 |
| 2020/0307342 A1* | 10/2020 | Kubota | B60G 21/073 |

* cited by examiner

NOISE IMPROVEMENT FOR FAST HIGH LIFT GAS SPRINGS

TECHNICAL FIELD

The present disclosure relates to Noise, Vibration, Harshness (NVH) improvements for fast high lift gas springs. Aspects of the invention relate to a gas spring for use in a gas suspension system, to a gas suspension system and to a vehicle.

BACKGROUND

It is known to provide gas suspension systems in vehicles for maintaining and controlling ride height, and to dampen movements of the vehicle, particularly to reduce user perception of uneven road surfaces and to improve user comfort. Vehicle gas suspension systems are known to include one or more gas springs, which when installed around a vehicle and filled with compressed gas, serve to adjust a vehicle ride height and to mitigate unwanted movement of the vehicle cabin caused by travelling over uneven surfaces. The gas springs may be filled with compressed gas to varying pressures to change a vehicle ride height or to adjust the vehicle response to travel over an uneven surface.

The suspension systems typically comprise one or more gas springs, a gallery for supplying compressed gas to the gas springs, a compressor for compressing gas to supply to the gallery, and an exhaust for removing compressed gas from the suspension system. The gallery may comprise a volume connecting the compressor to the one or more gas springs and the exhaust via one or more valves which control the passage of compressed gas. The gallery may also connect the exhaust and compressor to other components, such as a compressed gas reservoir. The gallery may also be known as a compressed gas gallery, a common gallery or a central gallery.

The gas springs may comprise an internal volume which is configured to store compressed gas and a connection or inlet to connect the internal volume to a gas source, which may in some cases be a compressed gas gallery. The internal volume is filled with gas or compressed gas at varying pressures to control ride height of the vehicle and to control gas suspension properties of the vehicle, for example to control movement of the vehicle over uneven surfaces.

The gas suspension system may rapidly provide high pressure gas into the internal volume to quickly adjust ride height or change suspension characteristics. However, high velocity, high pressure gas entering the internal volume may cause unwanted noise or may be perceptible by a user of the vehicle or nearby persons. In particular, noise of such systems may be monitored and it is generally an aim to keep noise below a desired level. Noise may be measured as just sound, or may be measured as part of a metric which also considers other factors, such as NVH, which is a metric for measuring noise, vibration and harshness.

Reducing a velocity of gas being delivered to the internal volume may aid in reducing noise associated with filling the internal volume. However, this comes at the cost of reducing a speed of adjusting ride height, and so is not suitable for vehicles with rapid ride height adjustment. Further, internal volume size typically scales with vehicle size, so high velocity gas input is required in larger vehicles.

It is an aim of the present invention to address one or more of the disadvantages associated with the prior art.

SUMMARY

Aspects and embodiments of the invention provide a gas spring for use in a gas suspension system, a gas suspension system and a vehicle as claimed in the appended claims.

According to an aspect of the present invention there is provided a gas spring for use in a gas suspension system, the gas spring comprising:
  a gas inlet port configured to receive compressed gas; and
  a gas inlet chamber connected via an inlet conduit to the gas inlet port and via an opening to an internal volume of the gas spring;
  wherein the gas inlet chamber comprises a cylindrical volume having a longitudinal axis perpendicular to the longitudinal axis of the inlet conduit, and wherein an angle between the longitudinal axis of the inlet conduit and a tangent to the surface of the interior wall of the gas inlet chamber opposing the gas inlet port and intersecting the longitudinal axis of the inlet conduit is acute.

According to an aspect of the present invention there is provided a gas spring for use in a gas suspension system, the gas spring comprising:
  a gas inlet port configured to receive compressed gas; and
  a gas inlet chamber connected via an inlet conduit to the gas inlet port and via an opening to an internal volume of the gas spring;
  wherein gas entering the gas inlet chamber from the gas inlet port via the inlet conduit is directed towards a curved wall of the gas inlet chamber at an acute angle.

According to an aspect of the present invention there is provided a gas spring for use in a gas suspension system, the gas spring comprising:
  a gas inlet port configured to receive compressed gas; and
  a gas inlet chamber connected via an inlet conduit to the gas inlet port and via an opening to an internal volume of the gas spring;
  wherein the gas inlet port is connected to the gas inlet chamber via the inlet conduit so as to direct gas along a helical path between the inlet conduit and the opening.

According to an aspect of the present invention there is provided a gas spring for use in a gas suspension system, the gas spring comprising:
  a gas inlet port configured to receive compressed gas; and
  a gas inlet chamber connected via an inlet conduit to the gas inlet port and via an opening to an internal volume of the gas spring;
  wherein the inlet conduit is connected to the gas inlet chamber at a position offset from a central axis of the gas inlet chamber such that an angle between the longitudinal axis of the inlet conduit and a surface of an interior wall of the gas inlet chamber opposing the gas inlet port is acute.

Advantageously, compressed gas received through the gas inlet port approaches an opposing surface within the gas inlet chamber at an acute angle. As the gas flow doesn't impinge at a right angle on the opposing surface and begins to flow in a helical manner, the gas slows before entering the internal volume, and turbulence in the gas flow is reduced as the gas does not impinge on a perpendicular interface. Thus, a noise associated with providing compressed gas to the internal volume is reduced.

In an embodiment, the gas inlet chamber comprises a cylindrical volume between the inlet conduit and the opening. Advantageously, the cylindrical volume is shaped so as to direct the gas to flow in a helical manner and thus reduces noise associated with turbulence in the gas flow.

In an embodiment, the gas inlet chamber comprises a volume defined by one or more curved inner walls. Advantageously, the curve of the inner walls reduces turbulence associated with the gas impinging on the surface of the inner walls.

In an embodiment, the inlet conduit connects to the gas inlet chamber proximal to a closed end of the cylindrical volume, and the opening of the gas inlet chamber comprises an open end of the cylindrical volume distal to the closed end. Advantageously, the closed end of the cylindrical volume directs the gas toward the internal volume in a helical manner.

In an embodiment, the gas spring further comprises at least one switchable chamber configured to switchably connect to the gas inlet chamber or the internal volume of the gas spring to receive the compressed gas under control of a solenoid. Advantageously, the useable volume of the gas spring can be controlled to change, and thus one or more properties of the gas spring such as stiffness or damping can be varied.

In an embodiment, in use, the gas inlet chamber is configured to cause a helical gas flow from the inlet conduit through the gas inlet chamber. Advantageously, the gas flows toward the internal volume with reduced turbulence and slows as it approaches the internal volume. Thus, noise and vibrations associated with gas flow in the gas spring, and in particular with abrupt changes in the gas flow velocity, can be reduced.

In an embodiment, the gas inlet chamber is configured to cause the helical gas flow in dependence on ingress of compressed gas from the inlet conduit impinging on the surface of the interior wall of the gas inlet chamber and traversing the gas inlet chamber towards the internal volume.

In an embodiment, the longitudinal axis of the inlet conduit is perpendicular to a longitudinal axis of the internal volume.

In an embodiment, a longitudinal axis of the gas inlet chamber is parallel to the longitudinal axis of the internal volume.

In an embodiment, the internal volume comprises a cylindrical upper portion proximal to the gas inlet port and a cylindrical lower portion distal to the gas inlet port; and the gas inlet chamber is provided in the upper portion of the internal volume.

In an embodiment, the lower portion has a larger cross-sectional radius than the upper portion.

In an embodiment, the inlet conduit comprises a cylindrical volume extending to connect to the gas inlet chamber at a position offset from a centre of a cross-sectional area of the upper portion of the internal volume.

In an embodiment, the angle between the longitudinal axis of the inlet conduit and the surface of the interior wall of the gas inlet chamber opposing the gas inlet port is below 75°, below 60°, below 45°, or below 30°.

In an embodiment, the inlet conduit comprises a constant diameter. In an embodiment, the inlet conduit has a constant diameter of between 4 mm and 6 mm.

In an embodiment, the gas inlet port is configured to supply compressed gas to the gas inlet chamber at a pressure of up to 18 bar.

In an embodiment, the gas spring comprising a housing configured to house the internal volume and the gas inlet chamber.

In an embodiment, the internal volume is configured to expand in dependence on ingress of compressed gas into the internal volume from the gas inlet chamber.

According to another aspect of the present invention, there is provided a gas suspension system comprising one or more gas springs according to the preceding paragraphs.

In an embodiment, the gas suspension system comprises a volume connectable to the gas source connection and configured to store compressed gas and provide compressed gas to the gas inlet port.

In an embodiment, the gas suspension system comprises a compressor configured to compress gas and to supply compressed gas to the volume; and a controller configured to control compressed gas to be provided to the internal volume from the volume via the gas inlet port and the gas inlet chamber.

According to another aspect of the present invention, there is provided a vehicle comprising the gas spring according to the preceding paragraphs.

According to an aspect of the present invention there is provided a gas spring for use in a gas suspension system, the gas spring comprising:
  an gas source connection configured to receive compressed gas;
  an gas inlet chamber connected via a first opening to the gas source connection and via a second opening to an internal volume; and
  the internal volume configured to receive compressed gas from the gas source connection via the gas inlet chamber and to store the compressed gas;
  wherein the second opening has a significantly greater area than an area of the first opening.

Advantageously, compressed gas received through the gas source connection is permitted to expand in the gas inlet chamber due to the increase in size between the first opening and the second opening. Turbulence in the gas inlet chamber as compressed gas passes through is thereby reduced, and a noise associated with providing compressed gas to the internal volume is reduced.

In an embodiment, the gas source connection is substantially perpendicular to a longitudinal axis of the internal volume and the internal volume is displaced from the gas source connection in a direction parallel to the longitudinal axis of the internal volume.

In an embodiment, the gas inlet chamber defines a passage to direct compressed gas from the gas source connection to the internal volume.

In an embodiment, the gas inlet chamber is shaped to allow expansion of compressed gas when compressed gas passes through the gas inlet chamber from the gas source connection to the internal volume so as to reduce turbulence associated with the expansion of the compressed gas. Advantageously, the reduction in turbulence associated with the expansion of the compressed gas reduces a noise associated with gas entering the internal volume.

In an embodiment, the gas source connection is connectable to a compressed gas gallery of a vehicle gas suspension system.

In an embodiment, a cross-section of the gas inlet chamber taken across the longitudinal axis of the internal volume is formed to have a substantially rounded rectangular shape oriented length-ways substantially parallel to the longitudinal axis of the gas source connection, and at least one of a length and a width of the rounded rectangular cross-section increase between the first opening and the second opening.

In an embodiment, the length of the rounded rectangular cross-section of the gas inlet chamber corresponds to a distance the rounded rectangular cross-section of the gas inlet chamber extends in a direction parallel to the longitudinal axis of the gas source connection, and the width of the rounded rectangular cross-section of the gas inlet chamber corresponds to a distance the rounded rectangular cross-section of the gas inlet chamber extends in a direction perpendicular to the length of the rounded rectangular cross-section of the gas inlet chamber.

In some embodiments, the internal volume has a substantially cylindrical central portion; and the gas inlet chamber comprises a first wall proximal to the gas source connection that comprises the first opening and extends from the first opening to a wall of the central cylindrical portion of the internal volume in a direction parallel to the longitudinal axis of the internal volume.

In some embodiments, an end of portion of the internal volume proximal to the gas source connection has a substantially domed shape and the gas inlet chamber comprises a second wall extending in a curve from the first wall to meet the end portion of internal volume proximal to the gas source connection.

In some embodiments, the second wall of the gas inlet chamber meets the end portion of the internal volume proximal to an apex of the domed shape.

In some embodiments, the second wall is curved to follow an increase in the length of the rounded rectangular cross-section of the gas inlet chamber between the first opening and the second opening.

In some embodiments, the second opening has a shape corresponding to a shape of a portion of the domed end of the internal volume.

In some embodiments, the second wall extends from the first wall proximal to the first connection to the domed end of the internal volume, and the second wall comprises: a first portion proximal to the first wall and substantially parallel to the longitudinal axis of the gas source connection; and a second portion proximal to the domed end of the internal volume and substantially parallel to the longitudinal axis of the internal volume; and the second wall is continuously curved along a length between the first portion and the second portion.

In some embodiments, the gas inlet chamber comprises first and second side walls connecting between the first wall and the second wall of the gas inlet chamber between the first opening and the second opening and the first and second side walls are curved to follow an increase in the width of the rounded rectangular cross-section of the gas inlet chamber between the first opening and the second opening.

In some embodiments, the gas inlet chamber extends in an axis perpendicular to the longitudinal axis of the gas source connection and the longitudinal axis of the internal volume.

In some embodiments, the gas inlet chamber comprises a directed flow path, the directed flow path being formed as a section of the gas inlet chamber adjacent to and following the curve of the second wall and having a smaller size in the axis perpendicular to the longitudinal axes of the gas source connection and the internal volume than a portion of the gas inlet proximal to the first wall. Advantageously, a portion of compressed gas received from the gas source connection and having a high velocity is directed to the internal volume along the directed flow path.

In some embodiments, the internal volume is displaced from the longitudinal axis of the gas source connection in a direction parallel to the longitudinal axis of the internal volume.

In some embodiments, the area of the second opening is from approximately 30 to 100 times greater than the area of the first opening.

In some embodiments, the internal volume has a volume of from approximately 1.5 litres to 10 litres.

In some embodiments, the gas source connection comprises a compressed gas pipe having a constant diameter.

In some embodiments, the gas source connection is connectable to a source of compressed gas via a connection having a diameter of between approximately 4 mm and 6 mm.

In some embodiments, the gas source connection is configured to supply compressed gas at a pressure of from approximately 4 bar to 18 bar.

In some embodiments, the first opening has a cross-sectional area of 12.57 mm$^2$ and the second opening has a cross-sectional area of 430.33 mm$^2$.

In some embodiments, the gas spring comprising a housing configured to house the internal volume and the gas inlet chamber.

In some embodiments, the internal volume and the gas inlet chamber are formed as a single body.

In some embodiments, the internal volume is configured to expand in dependence on ingress of compressed gas into the internal volume from the gas inlet chamber.

According to another aspect of the invention, there is provided a gas suspension system comprising:
one or more gas springs according to any of the preceding statements; and
a volume connectable to the gas source connection and configured to store compressed gas and provide compressed gas to the gas source connection.

In some embodiments, the volume comprises a compressed gas gallery.

In some embodiments, the gas suspension system comprises a compressor configured to compress gas and to supply compressed gas to the volume; and a controller configured to control compressed gas to be provided to the internal volume from the volume via the gas source connection and the gas inlet.

According to another aspect of the invention, there is provided a vehicle comprises the gas spring or the gas suspension system.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
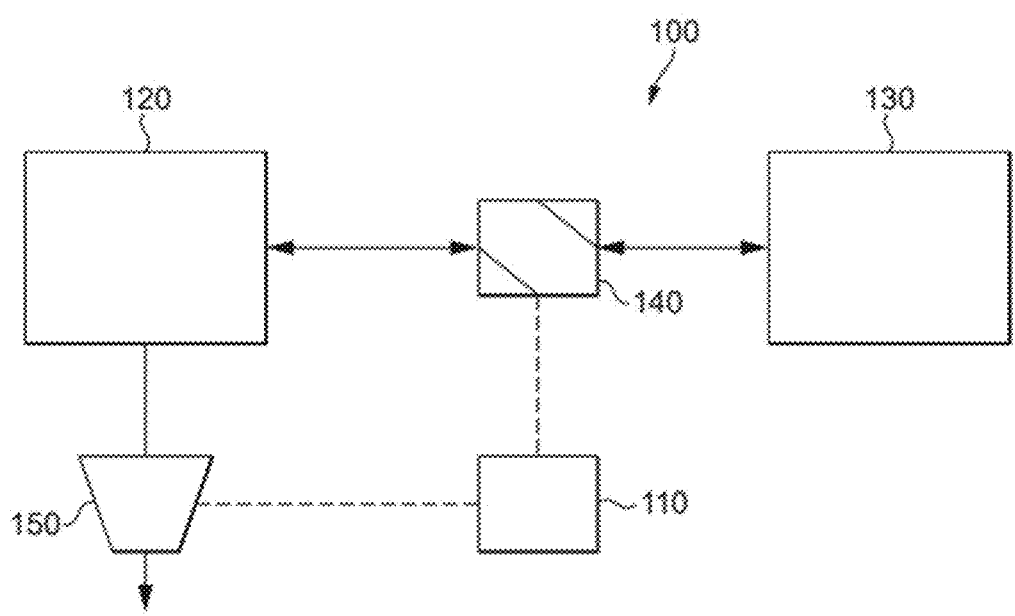
FIG. 1 shows a schematic diagram of a gas suspension system according to an embodiment of the invention.

FIG. 1 illustrates a gas suspension system 100 for use in a vehicle. Although not shown in FIG. 1, the system 100 of FIG. 1 may be installed in a vehicle in use. The system 100 of FIG. 1 comprises a controller 110, a first volume 120, a gas spring 130, a valve 140 and an exhaust valve 150. The system 100 of FIG. 1 may comprise additional components not shown in FIG. 1, as explained below. In some examples, the first volume 120 may be a compressed gas gallery of a vehicle.

The controller 110 of FIG. 1 is configured to control each of the valve 140 and the exhaust valve 150 to open and close. For example, the controller 110 may be communicatively coupled with the valve 140 and the exhaust valve 150 such that the controller 110 is configured to transmit control signals to the valve 140 and the exhaust valve 150 to control the valve 140 and the exhaust valve 150 to open or close (the control signals being illustrated by dashed lines in FIG. 1).

The controller 110 may further be configured to receive information or control signals from external sources or other parts of a vehicle, such as a vehicle communication bus, and make determinations to control the valve 140 and the exhaust valve 150 accordingly. The controller 110 is configured to determine a requirement for providing compressed gas to the gas spring 130. For example, the controller 110 may determine to supply compressed gas to the gas spring 130 based on a received control signal indicative of an adjustment to a gas suspension requirement of a vehicle, and control the valve 140 to open to transfer compressed gas from the first volume 120 to the gas spring 130. The controller 110 may be further configured to control the exhaust valve 150 to open to vent the first volume 120 to the external environment.

Figure 2:
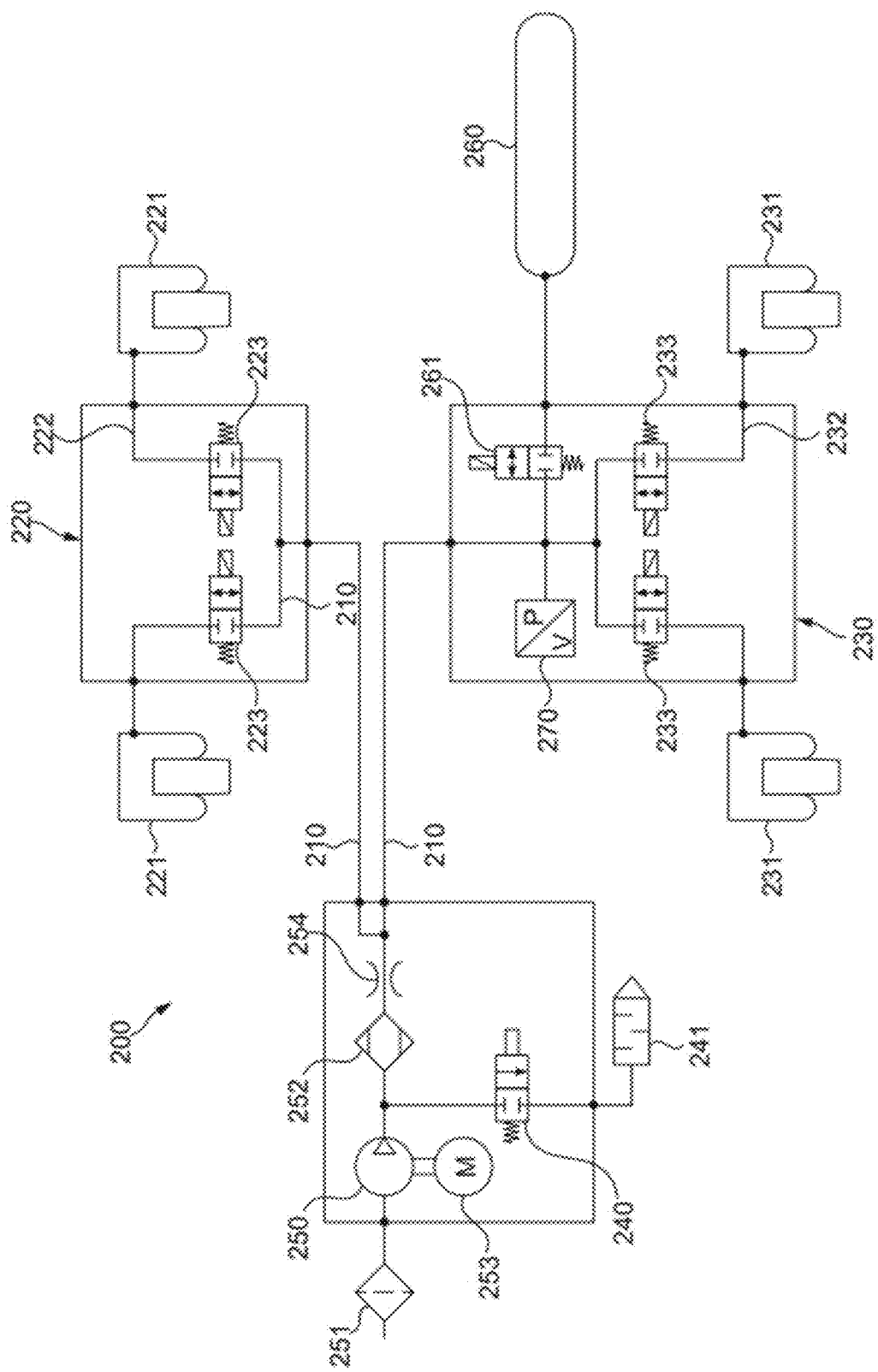
FIG. 2 shows a schematic diagram of a vehicle gas suspension system according to an embodiment of the invention.

The first volume 120 is a volume configured to store compressed gas. For example, the first volume 220 may be a compressed gas gallery of a vehicle gas suspension system. The compressed gas gallery is a volume of the vehicle gas suspension system which is provided to store compressed gas and to channel compressed gas between other parts of the vehicle gas suspension system. For example, the compressed gas gallery may be connected between a compressor, an exhaust, one or more compressed gas reservoirs, and one or more gas springs, as shown in FIG. 2. In the example where the first volume 120 is a compressed gas gallery of a vehicle, the compressed gas gallery may store compressed gas at a pressure of up to approximately 18 bar. For example, the compressed gas gallery may contain compressed gas at between 10 and 18 bar in use. In another example, the first volume 120 may be a reservoir of a vehicle gas suspension system that is configured to store compressed gas and to provide compressed gas to the gas spring 130. In some examples, the gas used within the system 100 may be air or may be nitrogen or a nitrogen based mixture of gases.

The first volume 120 and the gas spring 130 are selectively connected by the valve 140. The valve 140 may comprise an electrically operated valve configured to open and close in dependence on a control signal from the controller 110. For example, the valve 140 may comprise a channel which is mechanically opened and closed by the valve 140 in dependence on the control signal. When the channel is open, compressed gas is allowed to flow from the first volume 120 to the gas spring 130.

The gas spring 130 is configured to receive compressed gas from the first volume 120. The gas spring may be a part of a vehicle gas suspension system and may be installed on a vehicle in use. For example, the vehicle gas suspension system may comprise a plurality of gas springs 130 provided around the vehicle. In some examples, the vehicle gas suspension system may comprise one gas spring 130 per vehicle wheel, and in an example where the vehicle is a conventional car, may comprise a front left gas spring, a front right gas spring, a rear left gas spring and a rear right gas spring corresponding to convention car wheel placement.

The gas spring 130 may be configured to provide suspension related functions to the vehicle in use. For example, the gas spring 130 may act to dampen an effect of the vehicle traversing uneven terrain, such as driving a car over bumps or holes in the road surface. The gas spring 130 may also contribute to controlling a vehicle ride height. That is, the gas spring 130 may provide an adjustable suspension to the vehicle such that a ride height of the vehicle can be raised or lowered by adjusting a gas pressure in the gas spring 130. The gas pressure in the gas spring is adjustable by removing or increasing the amount of gas in the gas spring. The vehicle ride height is a height of a vehicle chassis or cabin relative to the ground.

The gas spring 130 comprises a volume which is configured to expand and contract in dependence on a gas pressure of the gas spring 130. That is, when the gas pressure of the gas spring 130 is increased by the ingress of compressed gas into the gas spring 130, the gas spring 130 expands and thereby raises the ride height of the vehicle. When compressed gas is removed from the gas spring 130, the gas spring 130 contracts and thereby reduces the ride height of the vehicle.

FIG. 2 shows a schematic diagram of a vehicle gas suspension system 200 according to an embodiment of the invention. Although not shown in FIG. 2, the system 200 of FIG. 2 may be installed in a vehicle in use.

The system 200 of FIG. 2 comprises a compressed gas gallery 210, a front valve block 220 connected to front gas springs 221, a rear valve block 230 connected to rear gas springs 231, an exhaust slave valve 240, an exhaust pilot valve, a silencer 241, a compressor 250 and a compressed gas reservoir 260. The system 200 of FIG. 2 may in some embodiments include further components or may omit some of the components shown. Although not shown, the system 200 of FIG. 2 may comprise a controller or be communicatively coupled with a controller. The front gas springs 221 and the rear gas springs 231 may correspond to the gas spring 130 of FIG. 1, and the compressed gas gallery 210 may correspond to the first volume 120 of FIG. 1.

In the example of FIG. 2, the system 200 comprises a compressed gas gallery 210. The compressed gas gallery 210 may be considered a first volume. The compressed gas gallery 210 is a volume configured to store compressed gas at up to a first pressure. The compressed gas gallery 210 is selectively coupled with the compressor 250, the exhaust slave valve 240, the exhaust pilot valve, the front valve block 220 and the rear valve block 230. The compressed gas gallery 210 is configured to store compressed gas and to provide compressed gas to vehicle systems including the gas springs 221, 231 of FIG. 2. In other words, the compressed gas gallery 210 is a central volume used for delivery and control of compressed gas to pneumatic vehicle systems including gas suspension springs. The compressed gas gallery 210 is configured to store compressed gas at a first pressure, the first pressure being greater than a gas pressure of an external environment. In certain examples, the first pressure may be up to approximately 18 bar. The compressed gas gallery 210 may have a volume of up to a litre, but may be different in other examples.

The system 200 of FIG. 2 includes a front valve block 220. The front valve block 220 may be positioned near a front end of a vehicle in use. For example, the front valve block 220 may be provided near an end of a vehicle proximal to a vehicle engine, and may be provided proximal to an underside of the vehicle. However, it should be understood that the position and function of the front valve block 220 is not limited thereto, and that the front valve block 220, and more specifically the front gas springs 221, are provided as an example of a second volume to which the first volume may be vented.

The front valve block 220 comprises one or more first valves 223. Although FIG. 2 illustrates there being two first valves 223 in the front valve block 220, a different number of valves 223 may be present. The first valves 223 connect the compressed gas gallery 210 to front gas springs 221 via a first compressed gas channel 222. The first valves 223 are configured to be operable to open and close so as to respectively allow or deny the passage of compressed gas between the compressed gas gallery 210 and the front gas springs 221. The front gas springs 221 are operable with compressed gas at a second pressure. The second pressure may be lower than the first pressure of the compressed gas gallery 210, such that when the first valves 223 are open, compressed gas flows from the compressed gas gallery 210 to the front gas springs 221 as a result of the pressure being greater in the compressed gas gallery 210 than in the front gas springs 221.

The front gas springs 221 are configured to be filled with compressed gas as part of a vehicle gas suspension system. The front gas springs 221 may therefore comprise a volume for storing compressed gas at a second pressure. FIG. 2 illustrates the system 200 as comprising two front gas springs 221, one to be provided on a left side of a vehicle and one to be provided on a right side of the vehicle. However, the system 200 is not limited thereto, and any number of front gas springs 221 may be present.

The system of FIG. 2 further comprises the rear valve block 230. The rear valve block 230 is similar to the front valve block 220, but may be provided proximal to a rear end of a vehicle in use. The rear valve block 230 may comprise one or more second valves 233 connecting the compressed gas gallery 210 to one or more rear gas springs 231 via a second compressed gas channel 232. The rear valve block 230, the one or more second valves 233, the one or more rear gas springs 231 and the second compressed gas channel 232 may respectively be similar to the front valve block 220, the one or more first valves 223, the one or more front gas springs 221 and the first compressed gas channel 222, and therefore a detailed description of each is omitted. However, these parts should be considered similar to the corresponding parts of the front valve block 220 discussed above.

The rear gas springs 231 may operate and be configured to store compressed gas at the second pressure, the same as the front gas springs. In some embodiments, the rear gas springs 231 may operate at and be configured to store compressed gas at a third pressure, different to the second pressure. The third pressure may be lower than the second pressure, or may be greater than the second pressure. The third pressure and the second pressure are both lower than the first pressure of the compressed gas gallery 210, and greater than a gas pressure of the external environment. In some examples, the first pressure is approximately 18 bar, the second pressure is between approximately 6 and 8 bar, and the third pressure is between approximately 4 and 10 bar. However, these pressures are provided as examples only. As with the front valve block 220, when the second valves 233 are opened, compressed gas can flow from the compressed gas gallery 210 to the rear gas springs 231 due to a pressure differential between the compressed gas gallery 210 at the first pressure and the rear gas springs 231 at the second pressure or the third pressure.

The rear valve block 230 of FIG. 2 is connected to a compressed gas reservoir 260 by a reservoir valve 261. However, the reservoir 260 may alternatively be connected to a different part of the system 200, for example to the compressed gas gallery 210 or the front valve block 220 by a different valve. The reservoir 260 is configured to store compressed gas, and may be configured to store compressed gas to be transferred to the gas springs via the compressed gas gallery 210. In certain embodiments, the reservoir 260 may have a volume of up to 12 litres, and may store compressed gas at the first pressure. For example, the reservoir may comprise a first reservoir having a volume of approximately 2.7 litres and a second reservoir having a volume of approximately 9 litres. However, these volumes are provided as examples only.

The rear valve block 230 of FIG. 2 is also shown to comprise a pressure transducer 270 configured to monitor the pressure in the system and provide information on the pressure in the system to a controller. For example, the pressure transducer 270 may be configured to provide feedback to a control system (not shown) and is pneumatically connected to the compressed gas gallery 210. For example, the pressure transducer 270 may measure the pressure of the compressed gas gallery 210 and provide an analog or digital signal to the control system indicative of the pressure of the compressed gas gallery 210. It should be understood that the pressure transducer 270 may be provided elsewhere in the system 200.

The system 200 of FIG. 2 further comprises an exhaust slave valve 240. The exhaust slave valve 240 is configured to selectively connect the compressed gas gallery 210 to the external environment. The exhaust slave valve 240 is operable to open and close so as to respectively allow or deny the passage of compressed gas from the compressed gas gallery 210 to the external environment. In some examples, the exhaust slave valve 240 is connected to the external environment via a silencer 241 which is configured to decrease a noise associated with compressed gas passing through the exhaust slave valve 240.

The system 200 of FIG. 2 may comprise an exhaust pilot valve. The exhaust pilot valve may be an electrically operable solenoid valve, configured to open and close in dependence on a control signal. The exhaust pilot valve is configured to control passage of gas through a pilot channel, which when the exhaust pilot valve is open, may control the slave valve 240 to open.

The system 200 of FIG. 2 further comprises a compressor 250. The compressor 250 is configured to intake gas, to compress the intake gas and to provide the compressed gas to the compressed gas gallery 210. The compressor 250 may be a compressor of any known type which is suitable for compressing gas to add into the system 200. For example, the compressor 250 may comprise a fixed displacement compressor or a variable displacement compressor. The system 200 may further comprise a dryer 252 configured to dry intake gas, a motor 253 to drive the compressor 250, a filter 251 to filter intake gas to remove particulates from intake gas, and a fixed restriction 254 to control a flow rate of gas from the compressor 250 into the compressed gas gallery 210.

The system 200 may comprise control means to control the system 200 in dependence on a determination that gas is to be added to the gas springs. If it is determined that gas is to be added to the gas springs, one or more of the first valve 223 or the second valve 233 may be controlled to open to allow the ingress of compressed gas into the front gas spring 221 or the rear gas spring 231 to increase the gas pressure in the gas springs. For example, gas may be provided to the gas springs to increase a vehicle ride height.

The compressed gas gallery 210 may be vented to the external environment through the exhaust slave valve 240, by operating the exhaust pilot valve to supply gas to the second cavity to open the exhaust slave valve 240. The exhaust slave valve 240 may be opened for a pre-determined period of time or until the gas pressure in the compressed gas gallery 210 reaches a target pressure.

Figure 3A:
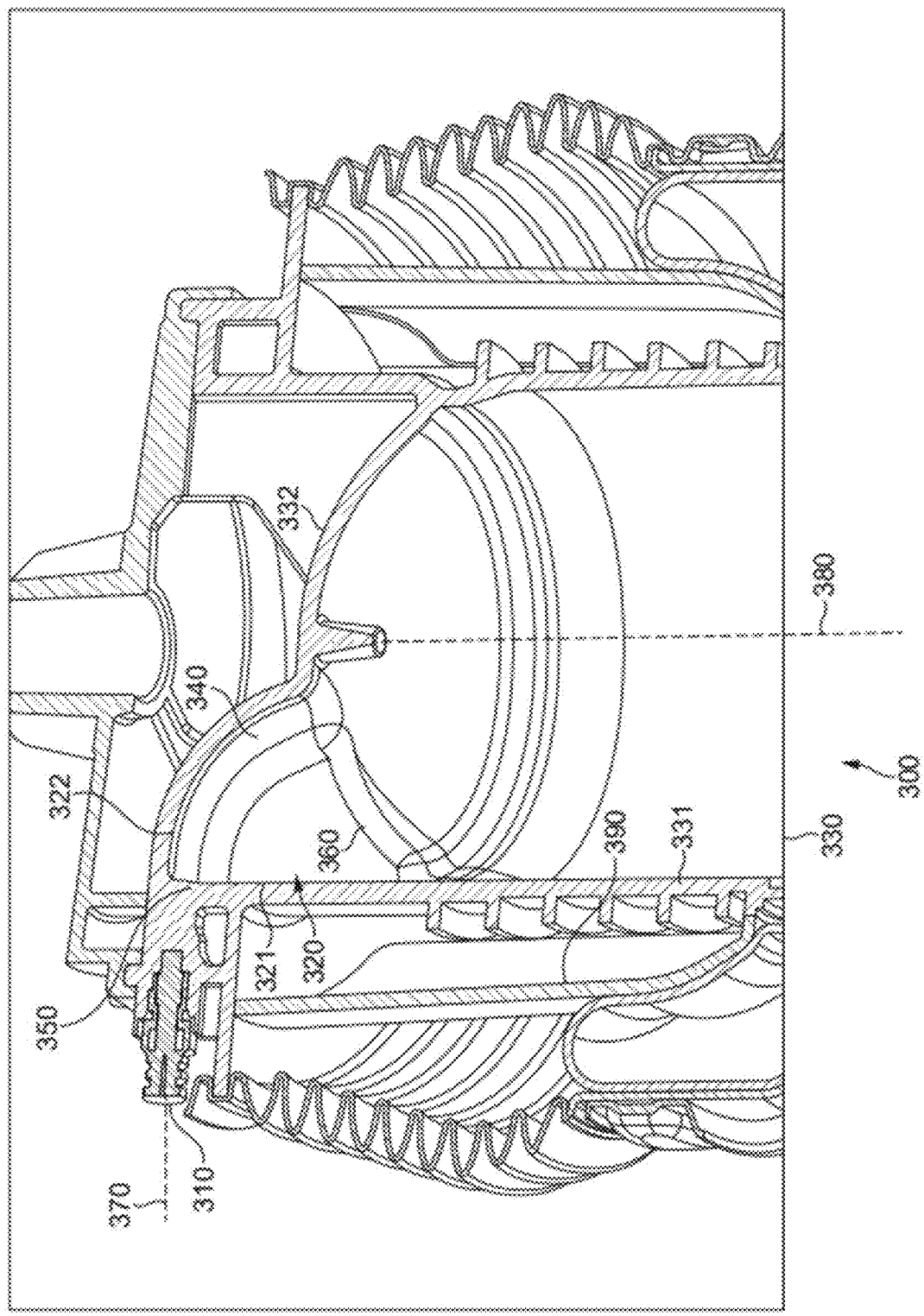
FIG. 3A shows a CAD drawing of a gas spring according to an embodiment of the invention.
Figure 3B:
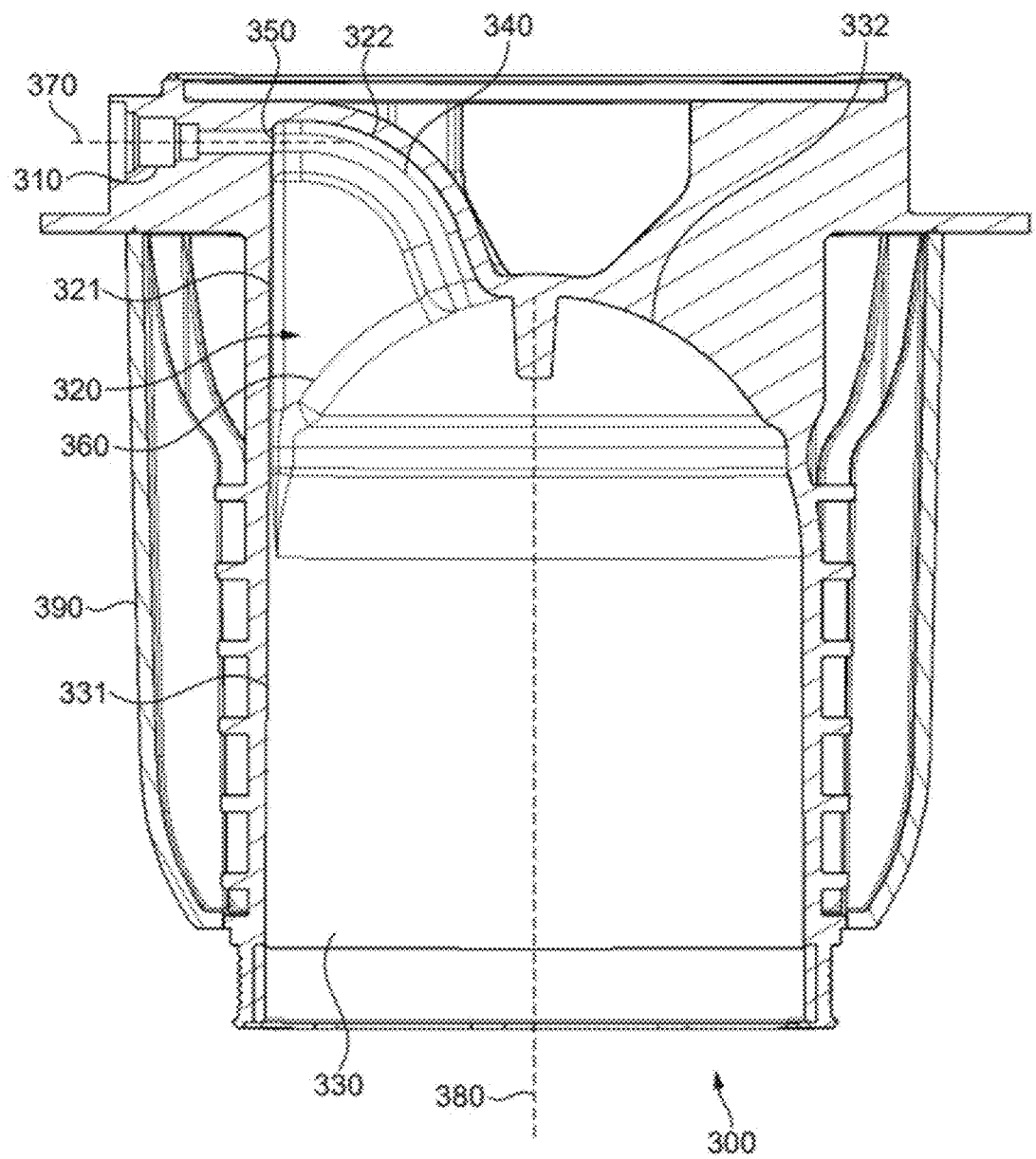
FIG. 3B shows a cross-sectional diagram of a gas spring according to an embodiment of the invention.

FIG. 3A shows a CAD drawing of a gas spring 300 according to an embodiment of the invention, and FIG. 3B shows a cross-sectional diagram of a gas spring 300 according to an embodiment of the invention. The gas spring 300 of FIG. 3 may correspond to the gas spring 130 of FIG. 1, or the front or rear gas springs 221, 231 of FIG. 2, and may be installed in a vehicle gas suspension system in use.

The gas spring 300 of FIG. 3 comprises a gas source connection 310, a gas inlet chamber 320 and an internal volume 330.

The gas source connection 310 is connectable to a source of compressed gas, for example the compressed gas gallery 210, the compressor 250 or the reservoir 260 of FIG. 2. The gas source connection 310 may comprise a connection for receiving compressed gas. In some examples, the gas source connection 310 comprises a tube configured to direct compressed gas from a part of a vehicle gas suspension system to the internal volume 330 via the gas inlet chamber 320. In one example, the gas source connection 310 comprises a tube having a substantially circular cross-section having an internal diameter of between approximately 4 mm and 6 mm, and may have a constant diameter along its length. The tube may have a wall thickness of approximately 1 mm; that is, a difference between an internal diameter of the tube and an outer diameter of the tube may be approximately 2 mm. A diameter of the gas source connection 310 may be slightly smaller than an internal diameter of the tube to prevent turbulence where gas passes from the tube through the gas source connection 310 to the gas inlet chamber 320. FIG. 3 shows a gas spring 300 in a particular orientation to explain the gas source connection 310, the gas inlet chamber 320 and the internal volume 330. However, it should be understood that the gas spring 300 may be installed at a different orientation in use. For example, the gas source connection 310 may be provided at a lower end of the internal volume 330 relative to gravity.

In the gas spring 300 of FIG. 3, a longitudinal axis 370 of the gas source connection 310 is substantially perpendicular to a longitudinal axis 380 of the internal volume 330 and the internal volume 330 is displaced from the gas source connection 310 in a direction parallel to the longitudinal axis 380 of the internal volume 330. In some examples, the gas inlet chamber 320 defines a passage to direct compressed gas from the gas source connection 310 to the internal volume 330. The gas source connection 310 may be connectable to a compressed gas gallery 210 of a vehicle gas suspension system 200. The gas source connection 310 may receive compressed gas from a gas source operable at pressures between approximately 4 and 18 bar.

The gas inlet chamber 320 comprises a first opening 350 and a second opening 360. The gas inlet chamber 320 is connected at the first opening 350 to the gas source connection 310 and at a second opening 360 to the internal volume 330. The gas inlet chamber 320 is configured to direct gas received from the gas source connection 310 to the internal volume 330. Gas may be received at the gas source connection 310 at a high velocity, and as such a change in direction of the high velocity gas from travelling substantially parallel to a longitudinal axis 370 of the gas source connection 310 to substantially parallel to a longitudinal axis 380 of the internal volume 330 to enter the internal volume 330 may be associated with turbulence and noise associated with the turbulence. Therefore, it is an aim of the present invention to provide a gas inlet chamber 320 shaped to reduce the turbulence associated with a change in direction of the compressed gas and expansion of the compressed gas in the gas inlet chamber 320. It should be understood that the velocity of the gas received into the gas source connection 310 may vary between different examples, dependent on factors including vehicle or internal volume 330 size, an amount or speed of ride height adjustment to be made, a type of gas and a trigger for supplying the gas to the gas spring 300. The velocity of gas received at the gas source connection 310 may be from approximately 200 m/s to 300 m/s, but it should be understood that the velocity may vary outside of this range as discussed above.

The gas inlet chamber 320 of FIG. 3 is shaped to allow an expansion of compressed gas in the gas inlet chamber 320 with reduced turbulence compared to in a conventional gas spring, which typically comprises a narrow section between the gas source connection 310 and the internal volume 330. The shape of the gas inlet chamber 320 contributes to achieving this effect. In particular, the gas inlet chamber 320 is shaped to expand after the first opening 350 to provide room for the compressed gas entering the gas inlet chamber 320 to expand with reduced turbulence before reaching the internal volume 330.

In FIG. 3, the first opening 350 of the gas inlet chamber 320 has a significantly smaller area than the second opening 360 of the gas inlet chamber 320. In other words, a cross-sectional area along a flow path of gas through the gas inlet chamber 320 increases between the gas source connection 310 and the internal volume 330. The second opening 360 may have an area that is substantially larger than the first opening 350. For example, the second opening 360 may have an area that is between 30 and 100 times the size of an area of the first opening 350, and as such a cross sectional area of the gas inlet chamber 320 increases between the first opening 350 and the second opening 360. The second opening 360 may in another example have a cross-sectional area that is from 30 to 50 times the cross-sectional area of the first opening 350. In another example, the cross-sectional area of the second opening 360 is approximately 34 times the cross-sectional area of the first opening 350.

The first opening 350 may be substantially circular in cross section and may have a diameter of between approximately 4 mm and 6 mm. The first opening 350 may therefore have an approximate cross-sectional area of between 12 mm$^2$ and 29 mm$^2$. The second opening 360 may be shaped to have a rounded rectangular cross-section as discussed in more detail with respect to FIG. 4 below. The cross-sectional area of the second opening 360 discussed below refers to a cross-section of the gas inlet chamber 320 at the second opening 360 taken as a plane perpendicular to the first wall 321 and extending from the first wall 321 to an end of the second wall 322 distal to the first wall 321 where the second wall 322 meets an end 332 of the internal volume 330. This corresponds to the cross-section shown in FIG. 4C. The second opening 360 may have a cross-sectional area of from approximately 360 mm$^2$ to 1200 mm$^2$ when the first opening 350 has a cross-sectional area of 12 mm$^2$, and the second opening may have a cross-sectional area of from approximately 870 mm$^2$ to 2900 mm$^2$ when the first opening 350 has a cross-sectional area of 29 mm$^2$. In one example, the first opening 350 has a cross-sectional area of 12.57 mm$^2$ the second opening 360 has a cross-sectional area of 430.33 mm$^2$ and the second opening 360 therefore has a cross-sectional area approximately 34 times the cross-sectional area of the first opening 350. It should be understood that the size of a gas spring 300 may vary between different vehicles, and as such the invention is not limited to the exact sizes provided as examples above. Further, it should be understood that the proportions of the second opening 360 in particular may vary depending on a shape of the end of the internal volume 330 proximal to the gas source connection 310.

The shape of the gas inlet chamber 320 of FIG. 3 may take several different forms, and therefore the present invention is not limited to the exact shape shown in FIG. 3.

In a first example implementation, the gas inlet chamber 320 may be formed to have a substantially semi-cylindrical shape with an increasing radius between the first opening 350 and the second opening 360. In other words, the gas inlet chamber 320 may have a cross-section through the longitudinal axis 380 of the internal volume 330 that is substantially semi-circular and a radius of the substantially semi-circular cross-section increases between the first opening and the second opening. In other words, the gas inlet chamber 320 may be formed to have a substantially a quarter-sphere shape, wherein the first opening 350 is positioned at a midpoint on an edge between the curved face and a flat face, and the second opening 360 is positioned across the other flat face. It should be understood that as shown in FIG. 3, the gas inlet chamber 320 may not correspond to an exact quarter-sphere, as in particular the second opening 360 may be provided across a section of a domed end of the internal volume 330 and as such may not correspond to a flat surface. Further, the flat face on which the first opening 350 is positioned may be tapered such that the flat face on which the first opening 350 is positioned is significantly narrower proximal to the first opening 350 than would be the case with an equal quarter-sphere. The second opening 360 is discussed in greater detail below. In addition, the gas inlet chamber 320 may not have equal proportions in an axis parallel to the longitudinal axis 380 of the internal volume 330 and an axis perpendicular to both the longitudinal axis 370 of the gas source connection 310 and the longitudinal axis 380 of the internal volume 330. This is explained in more detail with respect to FIG. 4. The gas inlet chamber 320 may have a substantially semi-cylindrical cross-section with an increasing radius between the first opening 350 and the second opening 360. However, the radius may not increase consistently or continuously along the length of the gas inlet chamber 320 between the first opening 350 and the second opening 360. For example, the radius may increase rapidly proximal to the first opening 350 and then may not increase significantly in a section proximal to the second opening 360. The gas inlet chamber 320 may also be considered to act as an inverted funnel, that is, to expand from a narrow first opening 350 to a larger second opening 360.

In a second example implementation, the cross section of the gas inlet chamber 320 across the longitudinal axis 380 of the internal volume 330 (i.e. a horizontal slice of the gas inlet chamber 320 shown in FIG. 3) has a rounded rectangular shape oriented length-way from the gas source connection 310 towards the apex of the dome, with a narrowed elongate end (shown in FIG. 4A) proximal to the longitudinal axis 380 of the internal volume 330 and which extends in a direction towards the longitudinal axis 380 of the internal volume 330. The cross section of the gas inlet chamber 320 increases in size in a direction parallel to the longitudinal axis 380 of the internal volume 330 in a direction from the gas source connection 310 towards the second opening 360 (shown in FIG. 4B). The narrowed elongate end may conform to the curvature of the dome as the gas inlet chamber 320 meets the dome of the internal volume 330. The cross section of the gas inlet chamber 320 along the longitudinal axis 380 of the internal volume 330 (i.e. a vertical slice of the gas inlet chamber 320 shown in FIG. 3) may be substantially quarter circular but where the lower side of the cross section (i.e. the second opening 360) has a shape that conforms to the profile of the dome of the internal volume 330 (shown in FIG. 4C).

The rounded rectangular cross-section of the gas inlet chamber 320 may be considered to be oriented length-ways substantially parallel to the longitudinal axis 370 of the gas source connection 310. In this case, the cross-section may be considered to comprise a length which corresponds to a distance in which the gas inlet chamber 320 extends in a direction substantially parallel to the longitudinal axis 370 of the gas source connection 310, and a width which corresponds to a distance in which the gas inlet chamber 320 extends in a direction perpendicular to the length. The cross-section may have a substantially rounded rectangular shape, i.e., may have greater length than width, and may include rounded or curved edges where length-ways walls meet width-ways walls. It should be understood that each of the length-ways walls and each of the width-ways walls may not be equal, and that, for example, the cross-section may have a different width or length at different points. For example, as shown in FIG. 4, the cross-section may have a narrower width at an end distal to the gas source connection 310.

The gas inlet chamber 320 may comprise a first wall 321 and a second wall 322. It should be understood that the gas inlet chamber 320 may be formed as a single body, that the first wall 321 and the second wall 322 may be contiguous, and that the division of the gas inlet chamber 320 into the first wall 321 and the second wall 322 is for the purposes of explanation only. As an alternative, the gas inlet chamber 320 may be formed of multiple pieces.

The first wall 321 of the gas inlet chamber 320 is provided proximal to the gas source connection 310 and extends from proximal to the gas source connection 310 in a direction substantially parallel to the longitudinal axis 380 of the internal volume 330. The first wall 321 may extend from a location proximal to the gas source connection 310 to meet a first wall 331 of the internal volume 330. The first wall 321 may have a length of between approximately 45 mm and 60 mm extending from proximal to the first opening 350 and the gas source connection 310 to meet a wall 331 of the internal volume 330. In one example, the first wall 321 may have a length of approximately 52.33 mm.

The second wall 322 of the gas inlet chamber 320 is connected to the first wall 321 of the gas inlet chamber 320 proximal to the gas source connection 310 and extends from the connection to the first wall 321 of the gas inlet chamber 320 in a direction initially substantially parallel to the longitudinal axis 370 of the gas source connection 310. The second wall 322 of the gas inlet chamber 320 may then follow a curve toward the longitudinal axis 380 of the internal volume 330 such that the second wall 322 faces substantially parallel to the longitudinal axis 380 of the internal volume 330 at the second opening 360. The first opening 350 and the second opening 360 may be defined as openings between the first wall 321 and the second wall 322 of the gas inlet chamber 320. The second wall 322 of the gas inlet chamber 320 may meet an end 322 of the internal volume 330 proximal to the gas source connection 310. The end 322 of the internal volume 330 proximal to the gas source connection 310 may be rounded or dome shaped, and the second wall 322 of the gas inlet chamber 320 may meet the end 322 of the internal volume 322 proximal to an apex of the domed shape. The second wall 322 may have a maximum length component extending in the direction parallel to the longitudinal axis 370 of the gas source connection 310 (i.e., an end of the second wall 322 distal to the first wall 321 may be displaced from the first wall 321 by a distance in an axis perpendicular to the first wall 321) of between approximately 30 mm and 40 mm, which in one example is approximately 36.66 mm when the first wall 321 has a length of approximately 52.33 mm. The maximum length component referred to above may also be considered to correspond to a length of a cross-section of the second opening 360 taken along the longitudinal axis 370 of the gas source connection 310, which is shown in FIG. 4C as a length along the longitudinal axis 370 that the cross-section of the gas inlet chamber 320 extends. In this example, the first opening 350 has a cross-sectional area of 12.57 mm$^2$ and the second opening 360 has a cross-sectional area of 430.33 mm$^2$, approximately 34 times the cross-sectional area of the first opening 350. However, it should be understood that the length of the second wall 322 may vary in dependence on a size of the internal volume 330 of the gas spring 300.

The second wall 322 of the gas inlet chamber 320 may be considered to comprise a first portion proximal to the first wall 321 and substantially parallel to the longitudinal axis 370 of the gas source connection 310 and a second portion proximal to the domed end of the internal volume 330 and substantially parallel to the longitudinal axis 380 of the internal volume 330. The second wall 322 may be continuously curved along a length between the first portion and the second portion.

The second opening 360 is provided where the gas inlet chamber 320 meets the internal volume 330 proximal to the end 332 of the internal volume 330. The second opening 360 may be shaped to correspond to both the gas inlet chamber 320 and the domed end 332 of the internal volume 330. That is, the second opening 360 may comprise a section of the domed end 332 of the internal volume 330 that is removed in correspondence with a shape of the gas inlet chamber 320 at the second opening 360. The second opening 360 may extend in an arc from the first wall 321 of the gas inlet chamber 320 proximal to the first wall 331 of the internal volume 330 to the second wall 322 of the gas inlet chamber 320 proximal to the domed end 332 of the internal volume.

The gas inlet chamber 320 may define a directed flow path 340, discussed in more detail with respect to FIG. 4. The directed flow path 340 may be a passage or a channel which is narrower in an axis perpendicular to both the longitudinal axis 370 of the gas source connection 310 and the longitudinal axis 380 of the internal volume 330. The directed flow path 340 may provide a channel for high velocity gas to pass through to enter the internal volume 330. The direction flow path 340 may follow the curve of the second wall 322 of the gas inlet chamber 320 proximal to the second wall 322 of the gas inlet chamber 320.

The internal volume 330 comprises a volume configured to contain compressed gas, and to expand in dependence on the ingress of additional compressed gas into the internal volume 330. The internal volume 330 may comprise multiple volumes or may comprise a single volume. The internal volume 330 or a volume thereof may be alternatively known as a 'gas bag' or 'gas sleeve', and may comprise a cylinder of rubber crimped to upper and lower parts of the gas spring. The internal volume 330 in some examples may have a volume of between approximately 1.5 and 10 litres. In another example, the internal volume 330 may have a volume of from 1.5 litres to 5 litres. In one example, the internal volume 330 has a volume of 3.55 L. However, it should be understood that the volume of the internal volume 330 may vary beyond this range, as it depends on factors including vehicle size and desired speed of ride height adjustment. Although the internal volume 330 may be considered as a "bag", it may be any volume suitable for containing compressed gas and expanding in dependence on the ingress of additional compressed gas. The internal volume 330 is sealed against the egress of compressed gas, and may be a sealed volume except for the gas source connection 310 for receiving compressed gas into the internal volume 330 and optionally a venting connection for removing compressed gas from the internal volume 330 (not shown). In some examples, the gas source connection 310 may also be configured to remove compressed gas from the internal volume 330.

The gas spring 300 may comprise a housing 390 configured to house the internal volume 330, the gas inlet chamber 320 and the gas source connection 310. The gas source connection 310 may extend from within the housing 390 to outside the housing 390.

Figure 4A:
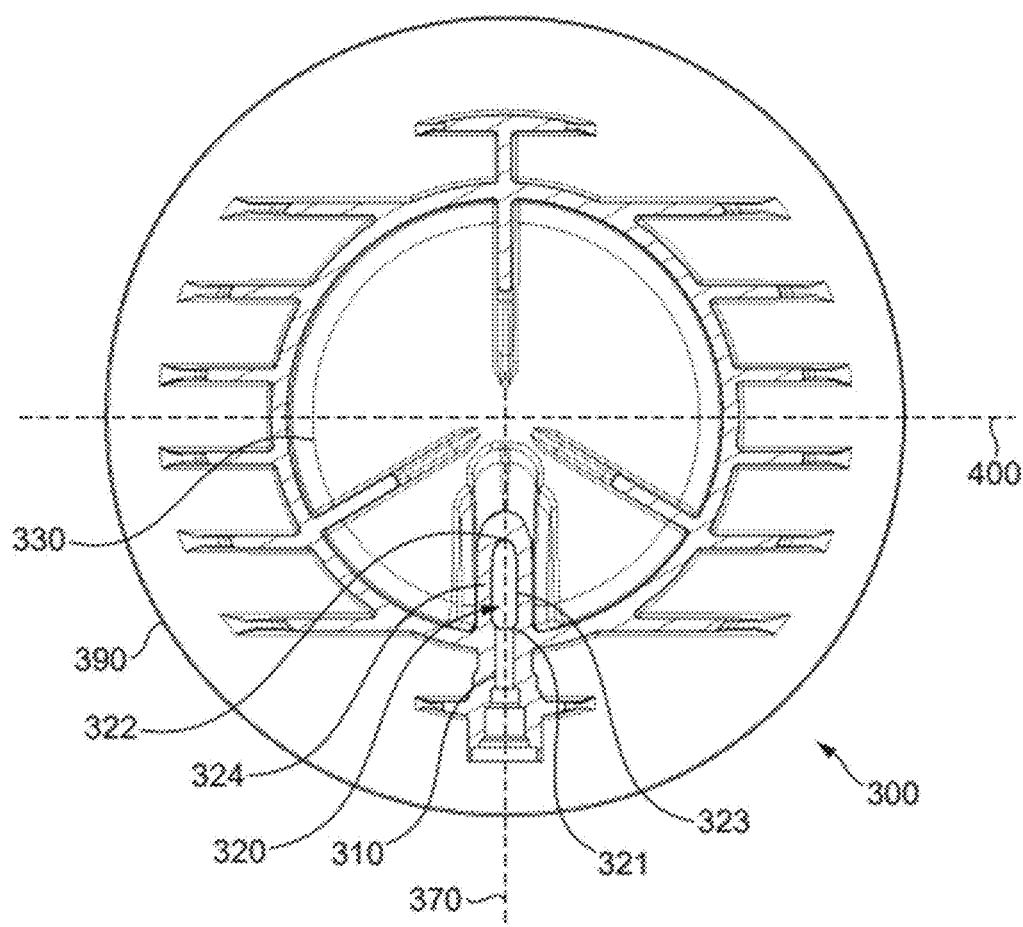
FIGS. 4A, 4B and 4C show cross-sectional diagrams of the gas spring of FIG. 3 taken at several positions along a longitudinal axis of an internal volume.
Figure 4B:
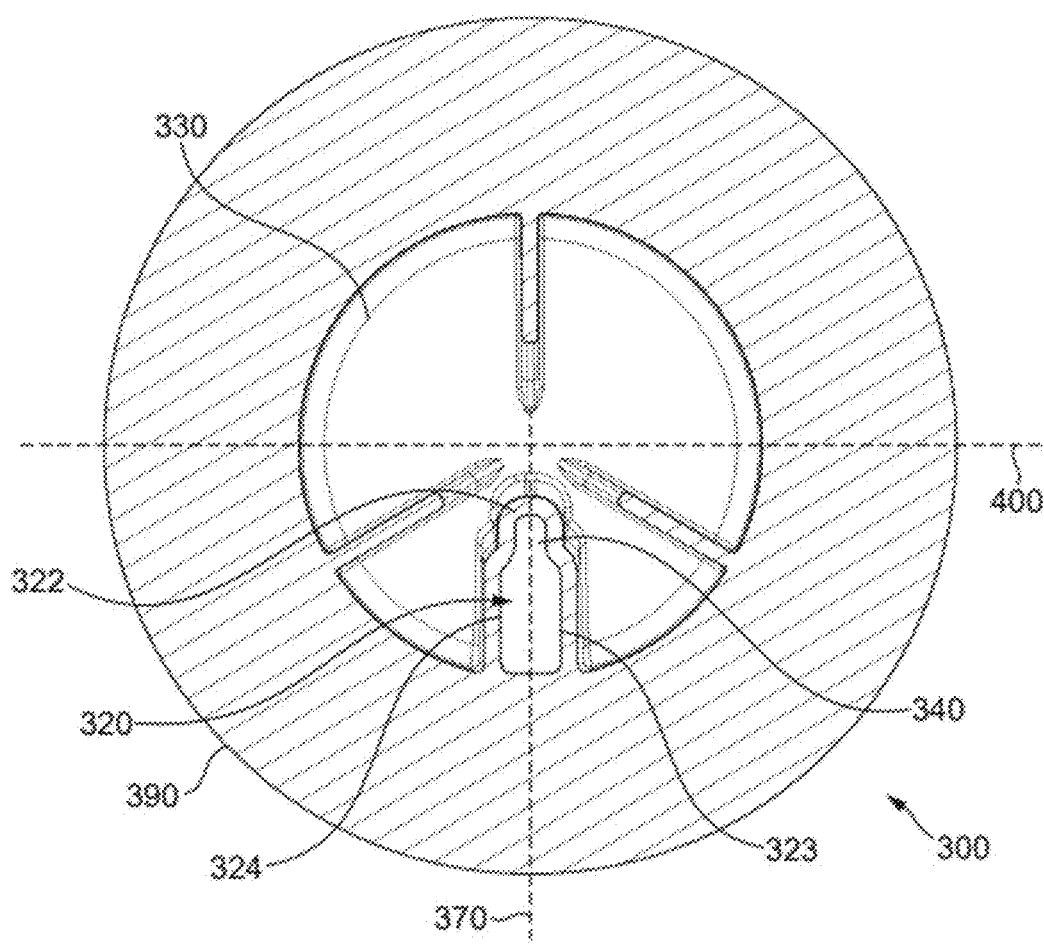
Figure 4C:
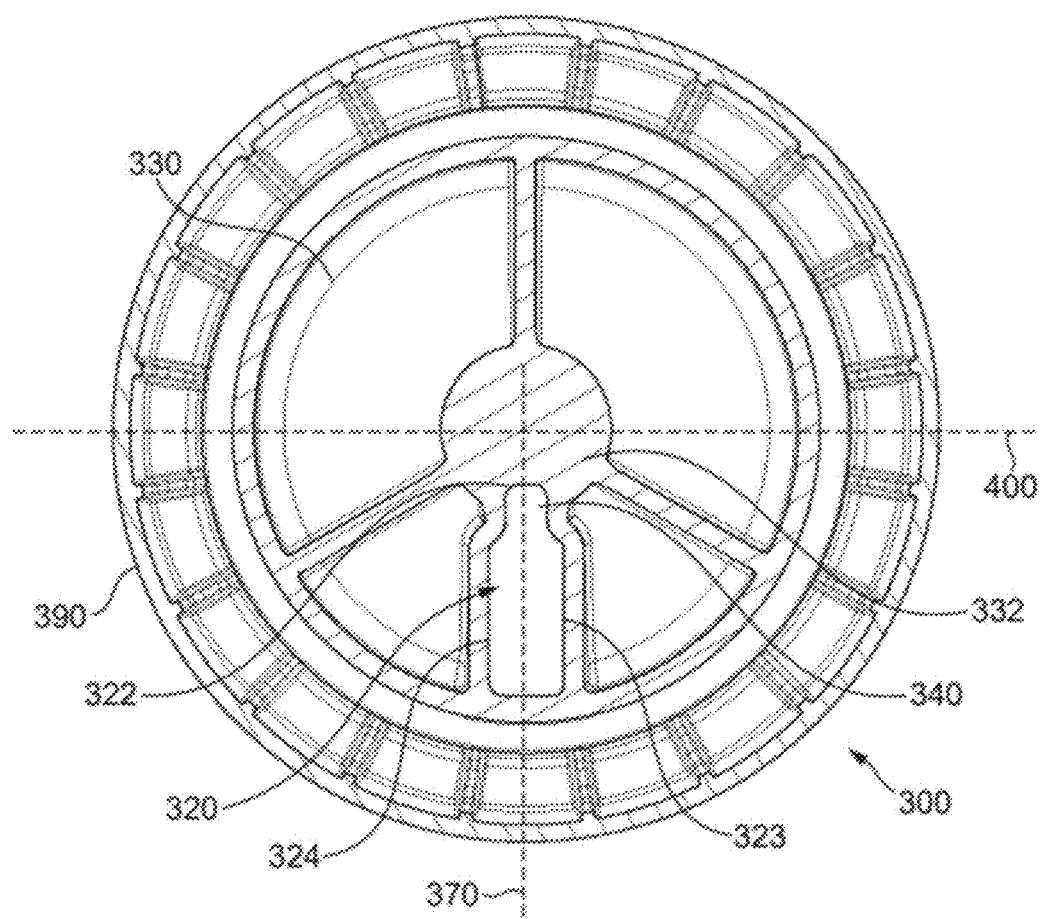

FIGS. 4A to 4C show cross-sectional diagrams of the gas spring 300 of FIG. 3 taken along an axis parallel to the longitudinal axis 370 of the gas source connection 310 at different positions along an axis parallel to the longitudinal axis 380 of the internal volume 330, or along the first wall 321 of the gas inlet chamber 320. FIG. 4A shows a cross-section taken proximal to the gas source connection 310, FIG. 4C shows a cross-section taken proximal to the second opening 360, and FIG. 4B shows a cross-section taken between FIGS. 4A and 4C.

FIG. 4A shows a cross-sectional diagram of the gas spring 300 of FIG. 3 taken along an axis parallel to the longitudinal axis 370 of the gas source connection 310 proximal to the gas source connection 310. In other words, FIG. 4A shows a slice of the gas spring 300 of FIG. 3 taken along a horizontal line across the gas spring 300 substantially parallel with longitudinal axis 370 of the gas source connection 310 proximal to the gas source connection 310. As can be seen from FIG. 4A, at a position along the longitudinal axis 380 of the internal volume 330 (i.e., extending into/out of the centre of FIG. 4A), and gas inlet chamber 320 is narrow in both a first direction parallel to the longitudinal axis 370 of the gas source connection 310 and in a second direction parallel to a third axis 400 perpendicular to both the longitudinal axis 370 of the gas source connection 310 and the longitudinal axis 380 of the internal volume 330. Further, the directed flow path 340 is not distinct at this position in the gas inlet chamber 320. At this point in the gas inlet chamber 320, gas received from the gas source connection 310 does not have room to expand significantly, and therefore turbulence associated with expansion of the compressed gas is less problematic. The longitudinal axis 380 of the internal volume 330 is located at the intersection of the longitudinal axis 370 of the gas source connection 310 and the third axis 400.

FIG. 4B shows a cross-sectional diagram of the gas spring 300 of FIG. 3 taken along an axis parallel to the longitudinal axis 370 of the gas source connection 310, at a position between the gas source connection 310 and the domed end 332 of the internal volume 330. In other words, FIG. 4B shows a slice of the gas spring 300 of FIG. 3 taken along a horizontal line across the gas spring 300 at a position along the first wall 321 of the gas inlet chamber 320 between the first opening 350 and the second opening 360. As can be seen from comparison of FIG. 4A and FIG. 4B, the gas inlet chamber 320 expands in both the first direction parallel to the longitudinal axis 370 of the gas source connection 310 and the second direction parallel to the third axis 400. That is, the gas inlet chamber 320 increases in size in a direction parallel to the longitudinal axis 370 of the gas source connection 310, and in a direction along the third axis 400 perpendicular to the longitudinal axis 370 of the gas source connection 310 and the longitudinal axis 380 of the internal volume 330. Further, the directed flow path 340 can be seen to extend from a main body of the gas inlet chamber 320 to follow the second wall 322 of the gas inlet chamber 320. The directed flow path 340 is narrower in the second direction parallel to the third axis 400 than a portion of the gas inlet chamber 320 proximal to the gas source connection 310. At this point in the gas inlet chamber 320, the gas inlet chamber 320 has rapidly expanded in volume or cross-sectional area, and gas received from the gas source connection 310 is permitted to expand with sufficient space to have lower turbulence during expansion, and therefore turbulence associated with expansion of the compressed gas is less problematic.

FIG. 4C shows a cross-sectional diagram of the gas spring 300 of FIG. 3 taken along an axis parallel to the longitudinal axis 370 of the gas source connection 310, at a position along the longitudinal axis 380 of the internal volume 330 proximal to the domed end 332 of the internal volume 330. In other words, FIG. 4B shows a slice of the gas spring 300 of FIG. 3 taken along a horizontal line across the gas spring 300 at a position along the first wall 321 of the gas inlet chamber 320 proximal to the second opening 360. The cross-section of the gas inlet chamber 320 shown in FIG. 4C may therefore be considered to correspond to the cross-section of the second opening 360.

As can be seen in FIG. 4C, the gas inlet chamber 320 continues to expand in both the first direction parallel to the longitudinal axis 370 of the gas source connection 310 and the second direction along the third axis 400. That is, the gas inlet chamber 320 increases in size in a direction parallel to the longitudinal axis 370 of the gas source connection 310, and in a direction along the third axis 400 perpendicular to the longitudinal axis 370 of the gas source connection 310 and the longitudinal axis 380 of the internal volume 330. The second wall 322 of the gas inlet chamber 320 can be seen to extend proximal to the centre of the diagram of FIG. 4C, which corresponds to the domed end 332 of the internal volume 330 of FIG. 3. The gas inlet chamber 320 is shaped to direct gas into the internal volume 330 while allowing for expansion of compressed gas within the gas inlet chamber 320.

As discussed in respect of FIG. 3, the gas inlet chamber 320 may be considered to have a cross-section taken across the longitudinal axis 380 of the internal volume 330 having a substantially rounded rectangular shape oriented lengthways substantially parallel to the longitudinal axis 370 of the gas source connection 310. This can be seen in FIGS. 4A to 4C which show the cross-section of the gas inlet chamber 320 across the longitudinal axis 380 of the internal volume 330.

In this case, the cross-section may be considered to comprise a length which corresponds to a distance in which the gas inlet chamber 320 extends in a direction substantially parallel to the longitudinal axis 370 of the gas source connection 310, and a width which corresponds to a distance in which the gas inlet chamber 320 extends in a direction perpendicular to the length. As can be seen from FIGS. 4A to 4C, the length of the cross-section of the gas inlet chamber 320 increases between the first opening 350 and the second opening 360. FIGS. 4A to 4C also show the width of the cross-section of the gas inlet chamber 320 increasing between the first opening 350 and the second opening 360. However, it should be understood that the width may alternatively remain constant between the first opening 350 and the second opening 360.

It should be noted that the increase in the size of the gas inlet chamber 320 between the first opening 350 and the second opening 360 may not be linear in both the first and second directions. For example, the gas inlet chamber 320 expands proportionally more quickly between FIGS. 4A and 4B than between FIGS. 4B and 4C. Further, the gas inlet chamber 320 may stop expanding in either the first direction or the second direction before it reaches the second opening 360 proximal to domed end 332 of the internal volume 330. In other words, the length and the width of the cross-section of the gas inlet chamber 320 may not increase linearly between the first opening 350 and the second opening 360. Additionally, the width of the rounded rectangular cross-section may remain constant between the first opening 350 and the second opening 360, or between a point between the first opening 350 and the second opening 360, and the second opening 360.

The gas inlet chamber 320 may be considered to comprise a first wall 321 which extends from proximal to the first opening 350 and the gas source connection 310 substantially parallel to a wall of the internal volume 330 to meet the wall of the internal volume 330. The gas inlet chamber 320 may also comprise a second wall 322 as discussed above which extends between the first wall 321 and the end 332 of the internal volume 330. The second wall 322 of the gas inlet chamber 320 may therefore be considered to follow an increase in the length of the rounded rectangular cross-section of the gas inlet chamber 320, and may be continuously curved along its length corresponding to a rate of increase of the length of the rounded rectangular cross-section of the gas inlet chamber 320 as shown in FIG. 3. It should be understood that at each of FIGS. 4A to 4C, a slice of the gas spring 300 of FIG. 3 is shown, and as such only a portion of the second wall 322 can be seen in each of FIGS. 4A to 4C.

The first wall 321 and the second wall 322 of the gas inlet chamber 320 may be connected by a first side wall 323 and a second side wall 324. The first and second side walls 323, 324 may extend from the first wall 321 to meet the second wall 322 and thereby define the gas inlet chamber 320. In FIGS. 4A to 4C, the first side wall 323 and the second side wall 324 may be curved to follow an increase in the width of the rounded rectangular cross-section of the gas inlet chamber 320. In other words, the side walls 323, 324 of the gas inlet chamber 320 may extend in a direction parallel to the longitudinal axis 380 of the internal volume 330 but each may be oriented by approximately 90 degrees with respect to the first wall 321 of the gas inlet chamber 320 and connected to the first wall 321 of the gas inlet chamber 320 at either end of the first wall 321 in the third axis 400 perpendicular to both the longitudinal axis 370 of the gas source connection 310 and the longitudinal axis 380 of the internal volume 330 to thereby define an extension of the gas inlet chamber 320 in a direction parallel to the third axis 400 i.e. the width of the gas inlet chamber 320. The first side wall 323 and the second side wall 324 may be curved or straight to follow an increase in the width of the rounded rectangular cross-section of the gas inlet chamber 320, or alternatively may have a constant separation in a case where the width of the rounded rectangular cross-section of the gas inlet chamber 320 does not increase between the first opening 350 and the second opening 360. The first side wall 323 and the second side wall 324 cannot be seen in FIG. 3, because FIG. 3 shows a cross-section of the gas spring 300 taken along an axis parallel to the first and second side walls 323, 324.

The directed flow path 340 may be described as a section of the gas inlet chamber 320 in which the width of the cross-section of the gas inlet chamber 320 is narrower at an end of the gas inlet chamber 320 distal to the gas source connection 310.

Figure 5:
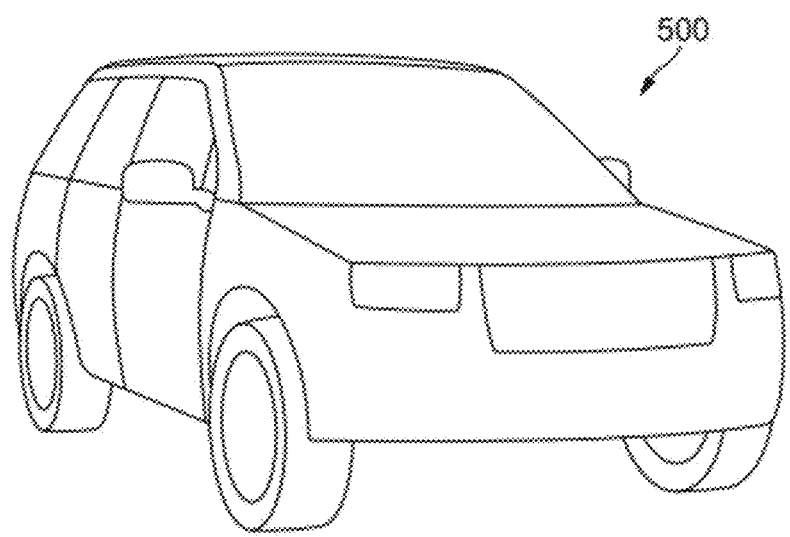
FIG. 5 shows a vehicle in accordance with an embodiment of the invention.

FIG. 5 illustrates a vehicle 500 according to an embodiment of the present invention. The vehicle 500 comprises a system 100 as illustrated in FIG. 1, a vehicle gas suspension system 200 as illustrated in FIG. 2, or a gas spring 300 as illustrated in FIGS. 3 and 4.

The gas spring, gas suspension system and vehicle discussed above with respect to FIGS. 1 to 5 may further be understood by the following numbered clauses:

1. A gas spring for use in a gas suspension system, the gas spring comprising:
   a gas source connection configured to receive compressed gas;
   a gas inlet chamber connected via a first opening to the gas source connection and via a second opening to an internal volume; and
   the internal volume configured to receive compressed gas from the gas source connection via the gas inlet chamber and to store the compressed gas;
   wherein the second opening has a significantly greater area than an area of the first opening.
2. The gas spring of clause 1, wherein a longitudinal axis of the gas source connection is substantially perpendicular to a longitudinal axis of the internal volume.
3. The gas spring of clause 2, wherein a cross-section of the gas inlet chamber taken across the longitudinal axis of the internal volume is formed to have a substantially rounded rectangular shape oriented length-ways substantially parallel to the longitudinal axis of the gas source connection; and
   wherein at least one of a length and a width of the rounded rectangular cross-section increase between the first opening and the second opening.
4. The gas spring of clause 3, wherein the length of the rounded rectangular cross-section of the gas inlet chamber corresponds to a distance the rounded rectangular cross-section of the gas inlet chamber extends in a direction parallel to the longitudinal axis of the gas source connection, and the width of the rounded rectangular cross-section of the gas inlet chamber corresponds to a distance the rounded rectangular cross-section of the gas inlet chamber extends in a direction perpendicular to the length of the rounded rectangular cross-section of the gas inlet chamber.
5. The gas spring of any of clauses 2 to 4, wherein the internal volume has a substantially cylindrical central portion; and
   wherein the gas inlet chamber comprises a first wall proximal to the gas source connection that comprises the first opening and extends from the first opening to a wall of the central cylindrical portion of the internal volume in a direction parallel to the longitudinal axis of the internal volume.
6. The gas spring of clause 5, wherein an end portion of the internal volume proximal to the gas source connection has a substantially domed shape; and
   wherein the gas inlet chamber comprises a second wall extending in a curve from the first wall to meet the end portion of the internal volume proximal to the gas source connection.
7. The gas spring of clause 6, wherein the second wall is curved to follow an increase in the length of the rounded rectangular cross-section of the gas inlet chamber between the first opening and the second opening.
8. The gas spring of clause 6 or clause 7, wherein the second wall of the gas inlet chamber meets the end portion of the internal volume proximal to an apex of the domed shape.
9. The gas spring of any of clauses 6 to 8, wherein the second opening has a shape corresponding to a shape of a portion of the domed end of the internal volume.
10. The gas spring of any of clauses 6 to 9,
    wherein the second wall extends from the first wall proximal to the first opening to the domed end of the internal volume;
    wherein the second wall comprises:
      a first portion proximal to the first wall and substantially parallel to the longitudinal axis of the gas source connection; and
      a second portion proximal to the domed end of the internal volume and substantially parallel to the longitudinal axis of the internal volume; and
    wherein the second wall is continuously curved along a length between the first portion and the second portion.
11. The gas spring of any of clauses 6 to 10, wherein the gas inlet chamber comprises first and second side walls connecting between the first wall and the second wall of the gas inlet chamber between the first opening and the second opening; and
    wherein the first and second side walls are curved to follow an increase in the width of the rounded rectangular cross-section of the gas inlet chamber between the first opening and the second opening.
12. The gas spring of any of clauses 6 to 11, wherein the gas inlet chamber extends in an axis perpendicular to the longitudinal axis of the gas source connection and the longitudinal axis of the internal volume.
13. The gas spring of clause 12, wherein the gas inlet chamber comprises a directed flow path, the directed flow path being formed as a section of the gas inlet chamber adjacent to and following the curve of the second wall and having a smaller size in the axis perpendicular to the longitudinal axes of the gas source connection and the internal volume than a portion of the gas inlet chamber proximal to the first wall.
14. The gas spring of any of clauses 2 to 13, wherein the internal volume is displaced from the longitudinal axis of the gas source connection in a direction parallel to the longitudinal axis of the internal volume.
15. The gas spring of any preceding clause, wherein the area of the second opening is from approximately 30 to 100 times greater than the area of the first opening.
16. The gas spring of any preceding clause, wherein the gas source connection comprises a compressed gas pipe having a constant diameter.
17. The gas spring of any preceding clause, wherein the gas source connection is connectable to a source of compressed gas via a connection having a diameter of between approximately 4 mm and 6 mm.
18. The gas spring of any preceding clause, wherein the gas source connection is configured to supply compressed gas at a pressure of up to approximately 18 bar.
19. The gas spring of any preceding clause, the gas spring comprising a housing configured to house the internal volume and the gas inlet chamber.
20. The gas spring of any preceding clause, wherein the internal volume and the gas inlet chamber are formed as a single body.
21. The gas spring of any preceding clause, wherein the internal volume is configured to expand in dependence on ingress of compressed gas into the internal volume from the gas inlet chamber.
22. An gas suspension system comprising:
    one or more gas springs according to any of the preceding clauses; and
    a volume connectable to the gas source connection and configured to store compressed gas and provide compressed gas to the gas source connection.
23. The gas suspension system of clause 22, wherein the volume comprises a compressed gas gallery.
24. The gas suspension system of clause 22 or clause 23, comprising:
    a compressor configured to compress gas and to supply compressed gas to the volume; and
    a controller configured to control compressed gas to be provided to the internal volume from the volume via the gas source connection and the gas inlet chamber.
25. A vehicle comprising the gas spring of any of clauses 1 to 21 or the gas suspension system of any of clauses 22 to 24.

Figure 6A:
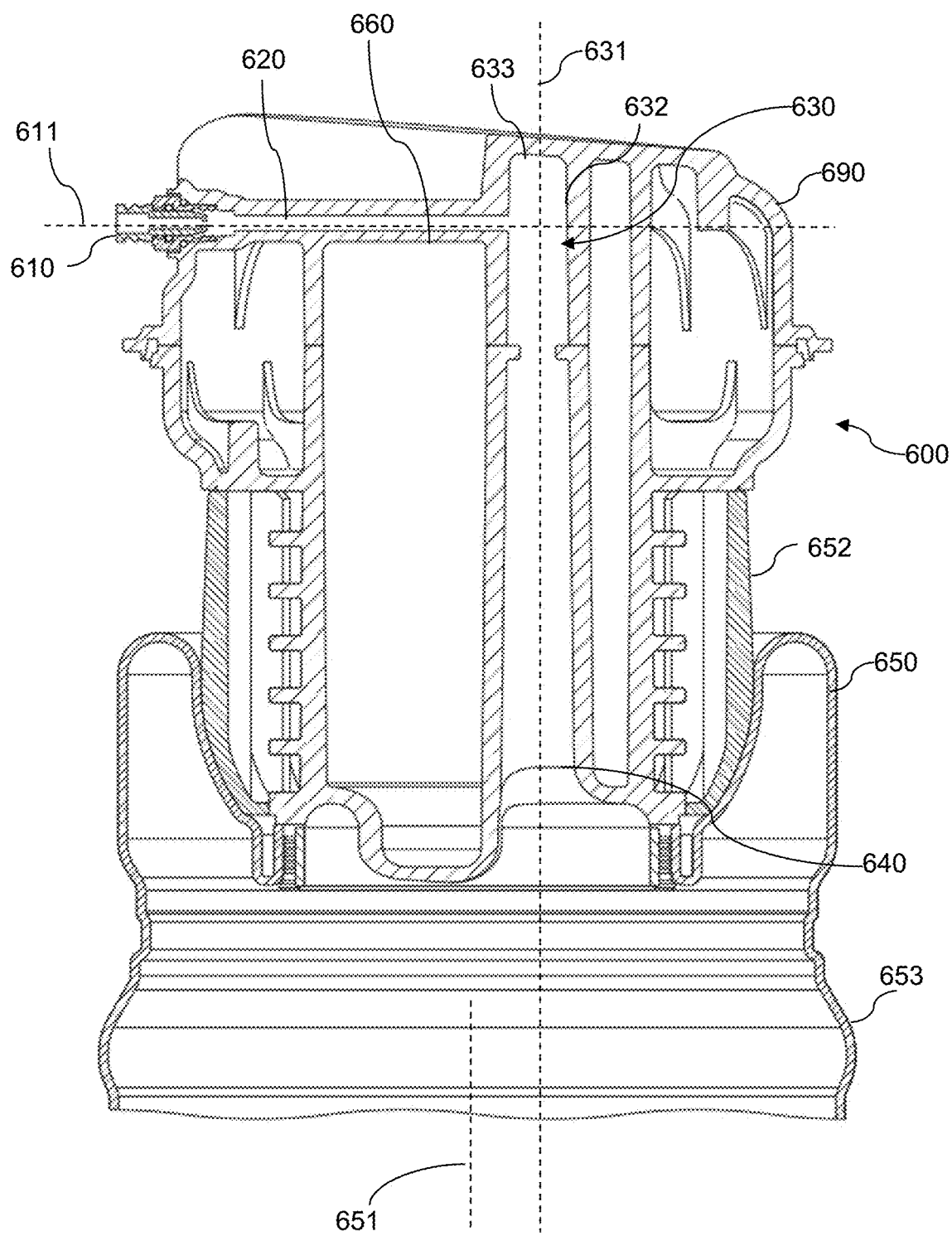
FIGS. 6A and 6B show a cross-sectional diagram of a gas spring according to an embodiment of the invention.
Figure 6B:
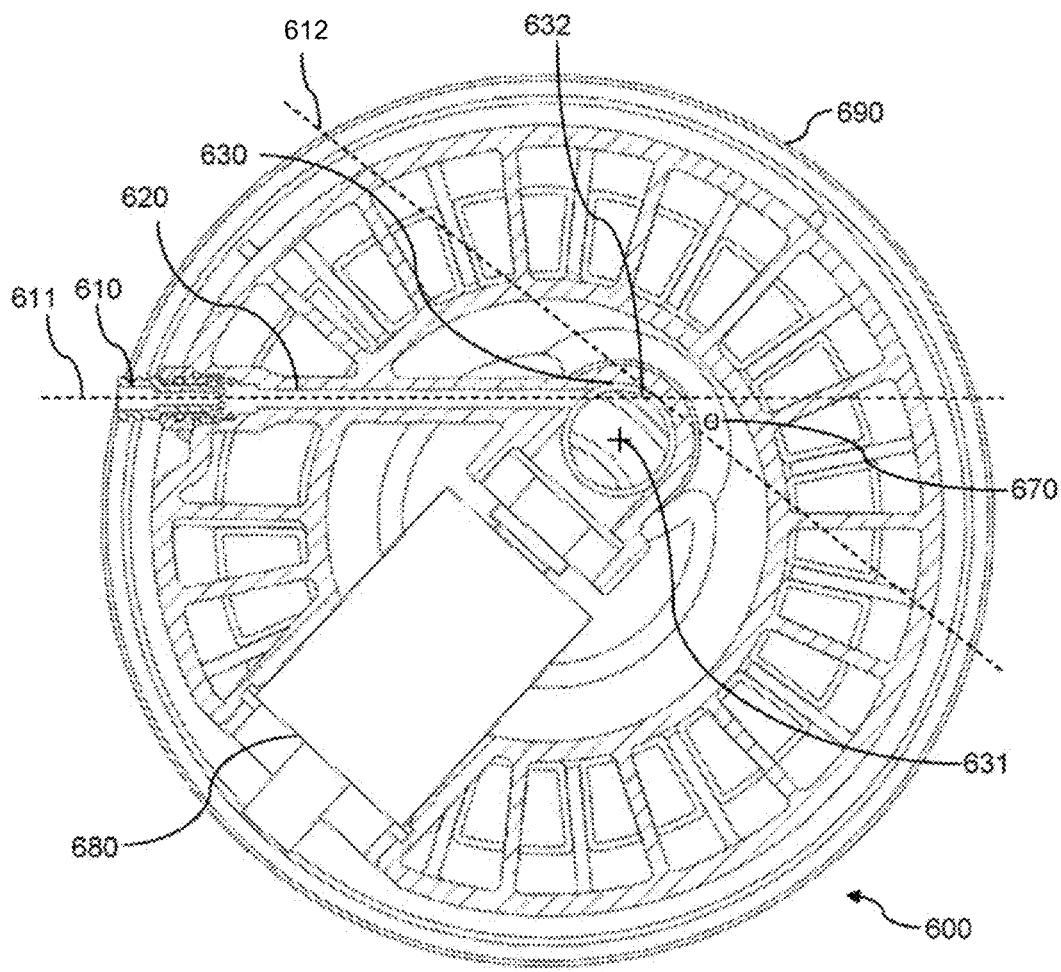

FIGS. 6A and 6B show an illustration of a gas spring 600 according to an embodiment of the present disclosure. FIG. 6A shows a vertical cross section of the gas spring 600 taken in a plane parallel to a longitudinal axis 651 of an internal volume 650 of the gas spring 600 (i.e., a plane parallel to a vertical wall of the internal volume 650, bisecting the gas spring 600 lengthways). FIG. 6B shows a horizontal cross section of an upper part of the same gas spring taken in a plane perpendicular to the longitudinal axis 651 of the internal volume 650 of the gas spring 600 (i.e., a plane perpendicular to a vertical wall of the internal volume 650, taken through the gas spring 600 at the position of the gas inlet port 610). In other words, FIG. 6B shows a cross-section taken along axis 611 in FIG. 6A, and FIG. 6A shows a cross-section taken along axis 611 shown in FIG. 6B.

The gas spring 600 of FIGS. 6A and 6B may correspond to the gas spring 130 of FIG. 1, or the front or rear gas springs 221, 231 of FIG. 2, and may be installed in a vehicle gas suspension system in use, such as the system 200 of FIG. 2. The gas spring 600 may also be installed in the vehicle 500 of FIG. 5.

The gas spring 600 of FIGS. 6A and 6B may be similar to the gas spring 300 of FIGS. 3 and 4 and may interface with the system 200 of FIG. 2 in a similar manner. For example, the gas spring 600 of FIGS. 6A and 6B may operate using the same supply of compressed gas discussed in respect of FIGS. 1 to 5, at the same pressures as previously discussed. Features of the gas spring 600 of FIGS. 6A and 6B which have already been described with respect to FIGS. 1 to 5 may only be briefly described below, but it should be understood that the description of such common features set out above is equally applicable to the gas spring 600 of FIGS. 6A and 6B. The gas spring 600 of FIGS. 6A and 6B differs from the gas spring 300 of FIGS. 3 and 4 in that the gas spring 600 of FIGS. 6A and 6B comprises a different arrangement for directing gas flow from a gas source to the internal volume.

The gas spring 600 of FIGS. 6A and 6B comprises a gas inlet port 610, a gas inlet chamber 630 connected to the gas inlet port 610 via an inlet conduit 620 and to an internal volume 650 of the gas spring 600 via an opening 640. It should be understood that FIG. 6A does not show all of the internal volume 650, and in particular does not show a bottom or lower end of the internal volume 650, which may continue as a volume extending downwards in FIG. 6A.

The gas inlet port 610 and the inlet conduit 620 may together be understood to perform a similar function as the gas source connection 310 of FIGS. 3 and 4, in that the gas inlet port 610 is configured to receive compressed gas from a source of compressed gas and provide the compressed gas to the gas inlet chamber 630 via the inlet conduit 620. The source of compressed gas may be the same sources as described above in respect of FIGS. 1 to 5, and may for example comprise a compressed gas gallery or a compressor of a gas suspension system 200.

The gas inlet port 610 and the inlet conduit 620 may each comprise a cylindrical or substantially cylindrical volume, having a common longitudinal axis 611 which extends through a centre of the cylindrical volume in a direction in which the cylindrical volume extends. It would be understood that a "substantially cylindrical" volume may be a volume which has a cross-section which is an oval or where a diameter of the cross-section of the volume varies along its length. The gas inlet port 610 and the inlet conduit 620 in some examples comprise a cylindrical volume having a constant diameter along its length. In one example, the constant diameter may be between 4 mm and 6 mm. As noted above, the gas spring 600 of FIGS. 6A and 6B may operate based on gas pressures as described in respect of the earlier Figures, and the gas inlet port 610 and the inlet conduit 620 may in one example be configured to supply compressed gas at a pressure of up to 18 bar to the gas spring 600. Although for the illustrated example the gas inlet port 610 and the inlet conduit 620 comprises a common longitudinal axis 611, it will be appreciated that in alternative examples they may comprise non-common longitudinal axes.

The gas inlet chamber 630 is connected to the gas inlet port 610 via the inlet conduit 620 proximal to a first end of the gas inlet chamber 630 and to the internal volume 650 via an opening 640 at a second end of the gas inlet chamber 630 distal to the first end. The gas inlet chamber 630 comprises a cylindrical or substantially cylindrical volume. It should be understood that the gas inlet chamber 630 may not be formed as an exact cylinder, but may for example have an oval cross-section, or a varying cross-sectional diameter along its length. The gas inlet chamber 630 is a volume defined by one or more curved inner walls 632. The gas inlet chamber 630 may comprise a closed end 633 at the first end, such that when gas is received into the gas inlet chamber 630, it cannot travel in a direction away from the internal volume 650 and is directed toward the internal volume 650. The gas inlet chamber 630 is connected to the gas inlet port 610 via the inlet conduit 620 at or proximal to a first end of the gas inlet chamber 630. That is, there may exist a volume of the gas inlet chamber 630 between the connection to the inlet conduit 620 and the first end of the gas inlet chamber, but this volume may be small compared to the volume of the gas inlet chamber 630. In this example, some gas may flow to fill this upper volume, while the majority of the gas flow is directed toward the internal volume 650.

As can be seen from FIG. 6A, the gas inlet port 610 and the inlet conduit 620 are arranged to be substantially perpendicular to the gas inlet chamber 630. That is, the gas inlet port 610 and the inlet 620 may be understood to be substantially horizontal when installed in use, and the gas inlet chamber 630 may be substantially vertical when installed; however, their orientation is not limited to this. The longitudinal axis 611 of the gas inlet port 610 and the inlet conduit 620 is perpendicular to a longitudinal axis 631 of the gas inlet chamber 630. It should be understood that the longitudinal axis 611 of the gas inlet port 610 and the longitudinal axis 631 of the gas inlet chamber 630 may not be exactly perpendicular, and may be substantially perpendicular. The longitudinal axis 631 of the gas inlet chamber 630 may otherwise be known as a central axis of the gas inlet chamber 630 as it extends centrally through the cylindrical volume forming the gas inlet chamber 630. The gas inlet chamber 630 is arranged substantially parallel to the internal volume 650. That is, the longitudinal axis 631 of the gas inlet chamber 630 is substantially parallel to a longitudinal axis 651 of the internal volume 650. The internal volume 650 may also be understood as being substantially vertical when the gas spring 600 is installed; however, its orientation is not limited to this. When viewed from above, the gas inlet chamber 630 overlaps the internal volume 650.

The internal volume 650 is similar to the internal volume 330 of FIGS. 3 and 4, and comprises a cylindrical or substantially cylindrical volume. The internal volume 650 is configured to expand in dependence on the ingress of gas from the gas inlet port 610 through the inlet conduit 620 and the gas inlet chamber 630, to thereby control spring characteristics of the gas spring 600. The internal volume 650 comprises a cylindrical upper portion 652 and cylindrical lower portion 653. The cylindrical upper portion 652 at least partially houses or surrounds the gas inlet port 610, the inlet conduit 620 and the gas inlet chamber 630. The lower portion 653 comprises a volume configured to expand in dependence on the ingress of gas. The lower portion 653 may comprise a volume with a larger radius than a radius of the upper portion 652.

In the example gas spring 600 of FIGS. 6A and 6B, the inlet conduit 620 is connected to the gas inlet chamber 630 at a position offset from a central axis 631 of the gas inlet chamber 630 such that an angle Θ 670 (shown in FIG. 6B) between a longitudinal axis 611 of the inlet conduit 620 and a surface of an interior wall 632 of the gas inlet chamber 630 opposing the gas inlet port 610 is acute. In some examples, the angle Θ 670 between the longitudinal axis 611 of the inlet conduit 620 and the surface of the interior wall 632 of the gas inlet chamber 630 opposing the gas inlet port 610 is below 75°, below 60°, below 45°, or below 30°. As shown in FIG. 6B, the acute angle 670 between the longitudinal axis 611 of the inlet conduit 620 and the opposing wall 632 may be achieved by arranging the inlet conduit 620 and the gas inlet chamber 630 such that the inlet conduit 620 connects to the gas inlet chamber 630 at a position offset from the central or longitudinal axis 631 of the gas inlet chamber 630 when viewed in the horizontal cross-section of FIG. 6B.

Advantageously, as the angle 670 between the longitudinal axis 611 of the inlet conduit 620 and the surface of the interior wall 632 of the gas inlet chamber 630 opposing the gas inlet port 610 is acute, gas entering the gas inlet chamber 630 from the inlet conduit 620 impinges on the surface of the opposing wall 632 at an angle that causes the gas to begin to flow in a circular manner around the interior walls 632 of the gas inlet chamber 630. As the gas inlet chamber 630 comprises a closed end 633 proximal to the connection with the inlet conduit 620, the gas begins to flow in a helical manner towards the internal volume 650. Compared to impinging on a perpendicular opposing interface, a velocity of the gas as it enters the gas inlet chamber 630 is reduced more gradually by impinging on the curved wall of the gas inlet chamber 630 at an acute angle, such that turbulence in the gas flow is reduced and thus noise associated with the operation of the gas spring is reduced. It should be understood that gas flow within the inlet conduit 620 is directed along the longitudinal axis 611 or in a direction parallel to the longitudinal axis 611 of the inlet conduit 620.

In other words, the gas inlet chamber 630 comprises a cylindrical volume having a longitudinal axis 611 perpendicular to a longitudinal axis 631 of the gas inlet port 630, and an angle 670 between the longitudinal axis 611 of the inlet conduit 620 and a tangent 612 to the surface of the interior wall 632 of the gas inlet chamber 630 opposing the gas inlet port 610 and intersecting the longitudinal axis 611 of the inlet conduit 620 is acute. As shown in FIG. 6B, when the angle between the longitudinal axis 611 of the inlet conduit 620 and the aforementioned tangent 612 is acute, gas flowing into the gas inlet chamber 630 from the inlet conduit 620 impinges on the surface of the interior wall 632 of the gas inlet chamber 630 at an angle which encourages the gas to flow around the wall 632 in a circular manner. As the top of the gas inlet chamber 630 comprises a closed end 633, the gas begins to flow downwards toward the internal volume 650 while still having circular lateral motion, thus following a helical or spiral path.

The gas spring 600, and more specifically the gas inlet port 610, the inlet conduit 620 and the gas inlet chamber 630 are arranged such that gas entering the gas inlet chamber 630 from the gas inlet port 610 via the inlet conduit 620 is directed towards the curved wall of the gas inlet chamber 630 at the acute angle 670.

In other words, the gas inlet port 610 is connected to the gas inlet chamber 630 via the inlet conduit 620 so as to direct gas along a helical path between the inlet conduit 620 and the opening 640 and the internal volume 650.

The gas spring 600 of FIGS. 6A and 6B is therefore arranged such that in use, the gas inlet chamber 630 is configured to cause a helical gas flow from the inlet conduit 620 through the gas inlet chamber 630 toward the internal volume 650. The helical gas flow is caused in dependence on ingress of compressed air from the gas inlet port 610 and the inlet conduit 620 impinging on the surface of the interior wall 632 of the gas inlet chamber 630 and traversing the gas inlet chamber 630 towards the internal volume 650. As explained above, the gas spring 600 of FIGS. 6A and 6B achieves a reduction in noise and vibrations associated with the operation of the gas spring, and particularly with an abrupt change in the path of compressed gas entering the gas spring, by directing the compressed gas in a helical manner toward the internal volume 650, thus reducing the rate of change of velocity of the compressed gas and reducing turbulence in the gas flow.

The angle 670 between the longitudinal axis 611 of the inlet conduit 620 and the surface of the interior wall 632 of the gas inlet chamber 630 opposing the gas inlet port 610 discussed above would be understood as the angle 670 between the longitudinal axis 611 of the inlet conduit 620 and the surface of the interior wall 632 of the gas inlet chamber 630 opposing the gas inlet port 610 when viewed in a plane perpendicular to the longitudinal axis 631 of the gas inlet chamber 630 (i.e. the angle 670 is in the plane in which the cross section of FIG. 6B is taken). That is, it should be understood that the longitudinal axis 611 of the inlet conduit 620 may be horizontal when the gas spring 600 is installed, while the interior wall 632 of the gas inlet chamber 630 is vertical, and thus there is a 90° angle between the longitudinal axis 611 of the inlet conduit 620 and the interior wall 632 when viewed in a vertical cross-section, as shown in FIG. 6A. However, as the interior wall 632 is curved, the longitudinal axis 611 of the inlet conduit 620 approaches the interior wall 632 at an acute angle 670 such that the surface of the interior wall 632 is not perpendicular to the longitudinal axis 611 of the inlet conduit 620 in a lateral or horizontal plane, as shown in FIG. 6B.

The gas spring 600 may further comprise a housing 690 configured to house one or more of the gas inlet port 610, the inlet conduit 620, the gas inlet chamber 630 and the internal volume 650.

The gas spring 600 may further comprise at least one switchable chamber 660 configured to switchably connect to the gas inlet chamber 630 or the internal volume 650 of the gas spring 600 under the control of a solenoid 680. The at least one switchable chamber 660 may be used to dynamically vary a volume of the gas spring 600 for receiving and storing compressed gas to thereby further control spring properties of the gas spring 600. In the upper portion 652 of the internal volume 650, the gas inlet chamber 630 may be provided in a position proximal to an end of an extension of the solenoid 680 from a wall of the housing 690 toward a centre of the gas spring 600, as shown in FIG. 6B. That is, the inlet conduit 620 may comprise a cylindrical volume extending to connect to the gas inlet chamber 630 at a position offset from a centre of a cross-sectional area of the upper portion 653 of the internal volume 650 so as to accommodate the solenoid 680.

Figure 7:
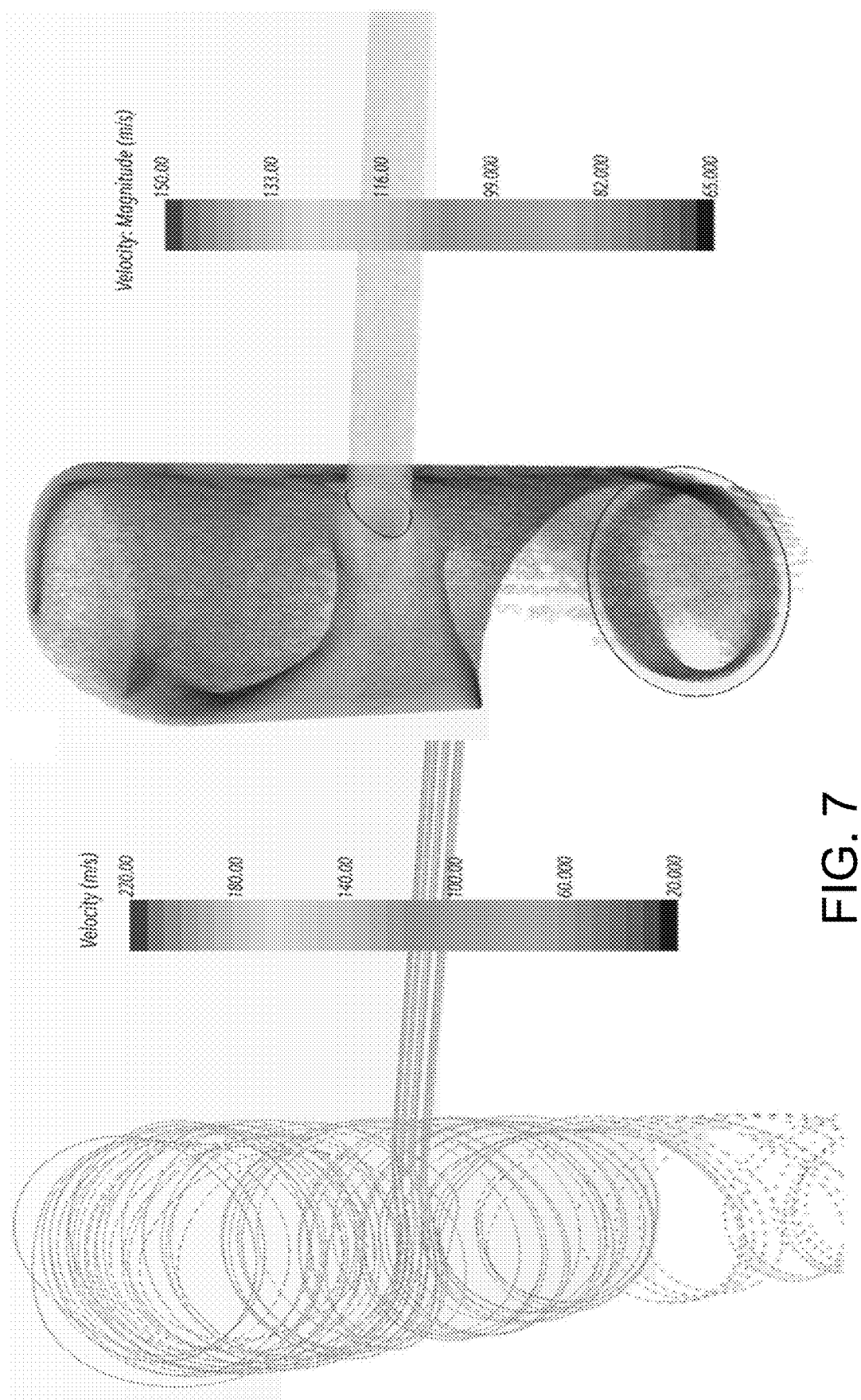
FIG. 7 shows illustrations of a simulation of gas flow in the gas inlet chamber of the gas spring of FIGS. 6A and 6B.

FIG. 7 shows a simulation of gas flow in the gas inlet chamber 630 of the gas spring 600 of FIGS. 6A and 6B. FIG. 7 shows two illustrations of gas flow entering the gas inlet chamber 630 from an inlet conduit located to the right of the cylindrical volume representing the gas inlet chamber 630. As can be seen in FIG. 7, as the gas flow enters the gas inlet chamber 630, the gas flow impinges on an interior surface of the gas inlet chamber 630 at an acute angle and begins to flow following the curved walls of the chamber. At the same time, the velocity of the gas flow decreases. The upper end of the gas inlet chamber 630 comprises a closed end, as discussed above. Consequently, the gas flow proceeds downwards, corresponding to toward the internal volume 650 in use. Thus, the gas flow follows a helical or spiral path toward the internal volume 650. As the velocity of the gas flow is reduced as it follows the curve of the interior walls and progresses downward toward the internal volume 650, turbulence in the gas flow is reduced and a noise associated with the operation of the gas spring is reduced.

It will be appreciated that various changes and modifications can be made to the present invention without departing from the scope of the present application.

The invention claimed is:

1. A gas spring for use in a gas suspension system, the gas spring comprising:
   a gas inlet port configured to receive compressed gas;
   a gas inlet chamber;
   an inlet conduit connecting the gas inlet chamber to the gas inlet port; and
   an opening connecting the gas inlet chamber to an internal volume of the gas spring;
   wherein the inlet conduit is connected to the gas inlet chamber at a position such that a longitudinal axis of the inlet conduit is offset from a central axis of the gas inlet chamber and such that an angle between the longitudinal axis of the inlet conduit and a surface of an interior wall of the gas inlet chamber facing the inlet conduit is non-perpendicular and such that gas entering the gas inlet chamber from the inlet conduit impinges the surface at the non-perpendicular angle,
   wherein the gas inlet port and the gas inlet chamber share a cross-sectional plane, the cross-sectional plane normal to the central axis of the gas inlet chamber.

2. The gas spring according to claim 1, wherein the gas inlet chamber comprises a cylindrical volume between the inlet conduit and the opening.

3. The gas spring according to claim 2, wherein the inlet conduit connects to the gas inlet chamber proximal to a closed end of the cylindrical volume, and the opening connecting the gas inlet chamber to the internal volume of the gas spring comprises an open end of the cylindrical volume distal to the closed end.

4. The gas spring according to claim 1, wherein the gas spring further comprises at least one switchable chamber configured to switchably connect to the gas inlet chamber or the internal volume of the gas spring to receive the compressed gas under control of a solenoid.

5. The gas spring according to claim 1, wherein in use, the gas inlet chamber is configured to cause a helical gas flow from the inlet conduit through the gas inlet chamber.

6. The gas spring according to claim 1, wherein the longitudinal axis of the inlet conduit is perpendicular to a longitudinal axis of the internal volume.

7. The gas spring according to claim 1, wherein the central axis of the gas inlet chamber is parallel to the longitudinal axis of the internal volume.

8. The gas spring according to claim 1, wherein the internal volume comprises a cylindrical upper portion proximal to the gas inlet port and a cylindrical lower portion distal to the gas inlet port; and
   wherein the gas inlet chamber is provided in the upper portion of the internal volume.

9. The gas spring according to claim 8, wherein the inlet conduit comprises a cylindrical volume extending to connect to the gas inlet chamber at a position offset from a centre of a cross-sectional area of the upper portion of the internal volume.

10. The gas spring according to claim 1, wherein the angle between the longitudinal axis of the inlet conduit and the surface of the interior wall of the gas inlet chamber facing the inlet conduit is below 75°, below 60°, below 45°, or below 30°.

11. The gas spring according to claim 1, wherein the inlet conduit comprises a constant diameter.

12. The gas spring according to claim 1, wherein the gas inlet port is configured to supply compressed gas to the gas inlet chamber at a pressure of up to 18 bar.

13. The gas spring according to claim 1, the gas spring comprising a housing configured to house the internal volume and the gas inlet chamber.

14. The gas spring according to claim 1, wherein the internal volume is configured to expand in dependence on ingress of compressed gas into the internal volume from the gas inlet chamber.

15. A gas suspension system comprising one or more gas springs according to claim 1.

16. The gas suspension system according to claim 15 comprising a volume connectable to a gas source connection and configured to store compressed gas and provide compressed gas to the gas inlet port.

17. The gas suspension system according to claim 16, comprising:
- a compressor configured to compress gas and to supply compressed gas to the volume; and
- a controller configured to control compressed gas to be provided to the internal volume from the volume via the gas inlet port and the gas inlet chamber.

18. A vehicle comprising the gas spring according to claim 1.

* * * * *